United States Patent [19]

Lopes

[11] Patent Number: 4,751,878
[45] Date of Patent: Jun. 21, 1988

[54] MANUFACTURE OF DECORATIVE ICE CREAM ROLLS

[75] Inventor: Jose A. Lopes, South Portland, Me.

[73] Assignee: Deering Ice Cream Corp., Portland, Me.

[21] Appl. No.: 70,149

[22] Filed: Jul. 2, 1987

Related U.S. Application Data

[63] Continuation of Ser. No. 936,115, Nov. 28, 1986, abandoned.

[51] Int. Cl.[4] .............................................. A23G 9/00
[52] U.S. Cl. .................................... 99/450.1; 99/452; 99/486; 99/487; 99/494; 99/516
[58] Field of Search ................................ 99/485–487, 99/494, 450.1, 450.2, 450.7, 452, 460, 516, 534; 426/101, 139, 249, 515, 565, 281, 282, 660; 141/129, 192; 118/16, 20, 24, 25

[56] References Cited

U.S. PATENT DOCUMENTS

| | | | |
|---|---|---|---|
| 2,646,757 | 7/1953 | Hackmann | 426/249 |
| 3,295,466 | 1/1967 | Bell et al. | 426/249 |
| 3,640,243 | 2/1972 | Dill et al. | 118/24 |
| 4,060,027 | 11/1977 | Jenny | 99/450.1 |
| 4,100,304 | 7/1978 | Getman | 426/515 X |
| 4,477,473 | 10/1984 | Schoonmaker et al. | 426/515 X |
| 4,505,220 | 3/1985 | Bank et al. | 118/16 |
| 4,518,617 | 5/1985 | Haas, Sr. et al. | 99/450.1 |
| 4,643,905 | 2/1987 | Getman | 99/494 X |

FOREIGN PATENT DOCUMENTS 311599  2/1969  U.S.S.R. .............................. 99/450.2

*Primary Examiner*—Timothy F. Simone
*Attorney, Agent, or Firm*—Daniel H. Kane, Jr.

[57] ABSTRACT

In a machine for manufacturing decorative ice cream rolls, an elongate frame supports a plurality of ingredient dispensing stations including ice cream dispensing stations arranged along the frame. An ice cream manifold is mounted on the frame for coupling a continuous flow source of pressuized ice cream through ice cream distribution lines to ice cream dispensing stations. A conveyor conveys a continuous ice cream roll body along the frame and along the respective ingredient dispensing stations. A support tray dispensing station delivers successive adjacent support trays onto the conveyor at the upstream end to support the continuous ice cream roll body extruded through a roll forming head. At least one ice cream dispensing ice cream wave forming station is provided along the frame with at least one ice cream dispensing tube or nozzle and motor for generating the wave form pattern through an eccentric slide coupling. At the end of the ingredient dispensing stations and conveyor an ice cream roll body cutting station cuts the ice cream roll body into separate ice cream rolls between successive adjacent support trays. Additional ingredient dispensing stations include a sauce spray dispensing station; ice cream rosette dispensing station; a sauce flow dispensing station; and a solids dispenser for dispensing solids such as nuts and condiment pieces. Centralized control, timing, and sequencing of the operation of most of the ingredient dispensing stations is provided by a programmed controller electrically coupled through control solenoids to pneumatic valves and cylinders at the dispensing stations.

20 Claims, 11 Drawing Sheets

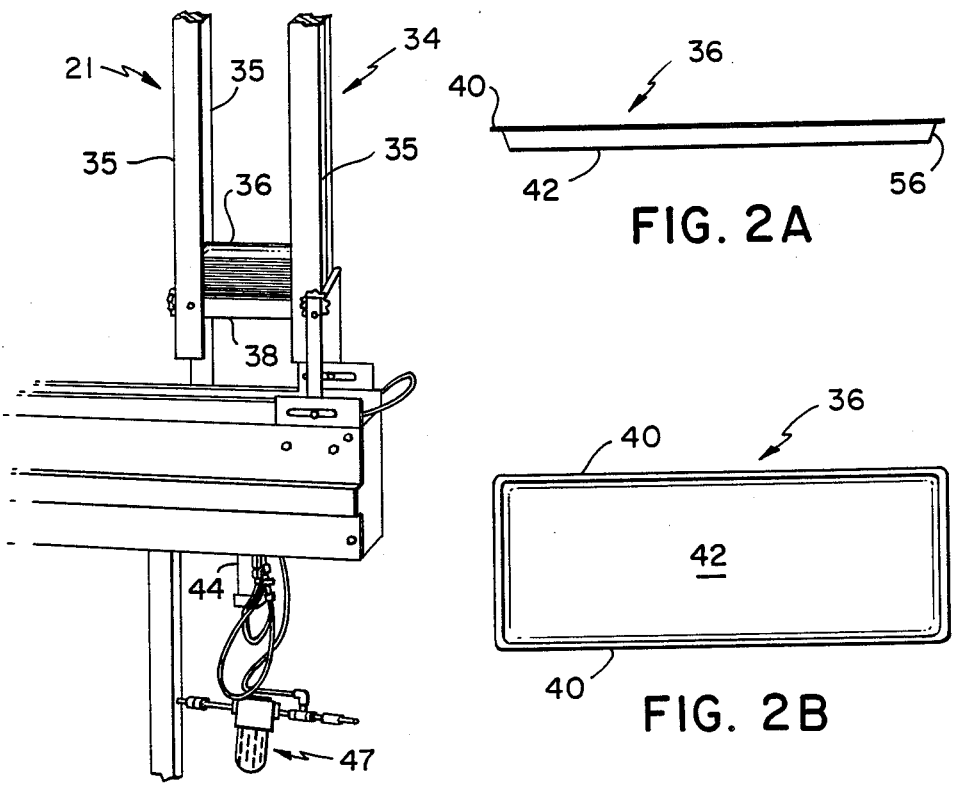
FIG. 2
FIG. 2A
FIG. 2B
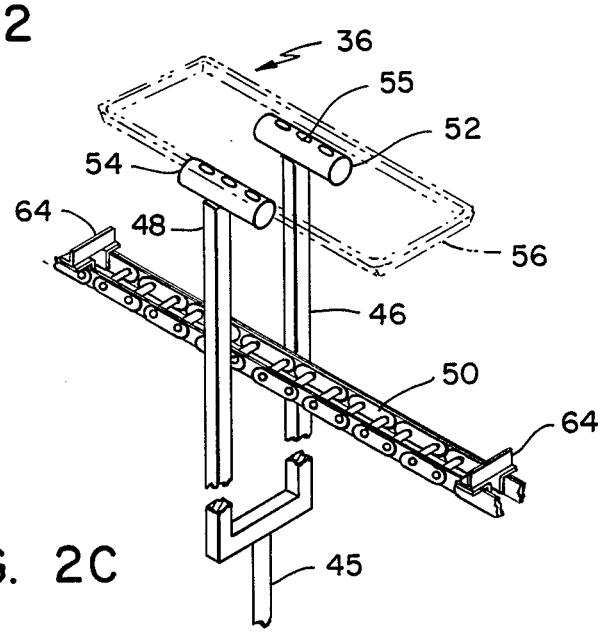
FIG. 2C

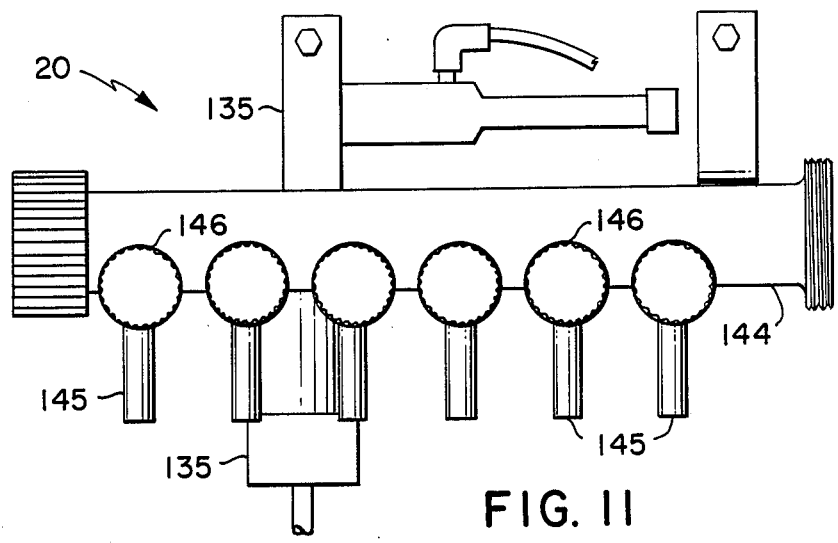
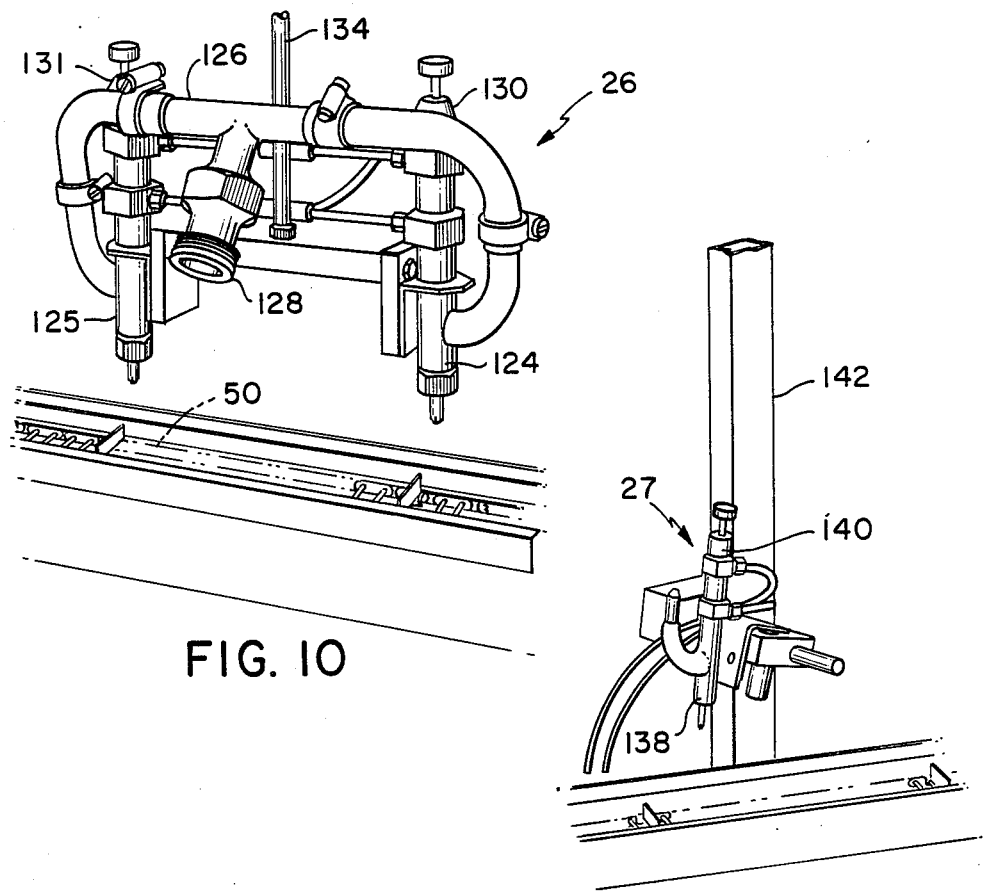

MANUFACTURE OF DECORATIVE ICE CREAM ROLLS

TECHNICAL FIELD

This invention relates to a new machine, system and method for forming and manufacturing decorative ice cream rolls and similar specialty ice cream products.

BACKGROUND ART

In applicant's co-pending U.S. patent application Ser. No. 914,446, filed Oct. 2, 1986, entitled MANUFACTURE OF SPECIALTY ICE CREAM PRODUCTS, there is described a machine and method for manufacturing separate multi-layered decorative ice cream cake and pie products. A machine frame supports a plurality of ingredient dispensing stations including ice cream dispensing stations. A conveyor conveys the discrete and separate products simultaneously between the respective stations for indexing and positioning the products. The product layers, ingredients, and decorative features are developed and formed at the successive ingredient dispensing stations.

The ice cream dispensers are mounted on lift positioning devices for lowering and raising the ice cream dispensers between a raised standby position and a lowered dispensing position. Ice cream dispensing valves on the ice cream dispensers open and close between a valve open position for flow of ice cream through an ice cream dispensing head from a continuous pressurized source of ice cream and a valve closed position for blocking the dispensing flow of ice cream. A flat forming surface on the ice cream dispensing head forms flat layers of ice cream on the discrete products.

An indexed timer actuates the conveyor to convey products between stations and to index products at each station for a selected dwell period. Position timers associated with the lift positioning devices actuate the lift to establish the dispensing position intervals. Valve timers associated with the respective ice cream dispenser valves establish valve open intervals.

The indexed timer dwell period, dispensing position intervals, and valve open intervals are operatively related and individually controlled through control elements. A central ice cream command and control panel permits an operator to achieve individualized control over operating parameters. For example the quantity, configuration and decorative effects of ice cream dispensed at each of the respective ice cream dispensing stations may be individually controlled or customized for different types of discrete products.

This system for manufacturing specialty ice cream products particularly lends itself to the manufacture of separate products such as pies and cakes comprised of flat generally parallel layers of ice cream and other pie and cake ingredients.

OBJECTS OF THE INVENTION

It is an object of the present invention to provide new machines and methods for continuous forming, processing, and manufacturing of specialty ice cream products such as decorative ice cream rolls comprised of arcuate layers of ice cream.

Another object of the invention is to provide a continuous process and system for forming, manufacturing and decorating a continuous ice cream roll body. The continuous roll body is subsequently cut into completed individual decorative ice cream rolls.

A further object of the invention is to provide a continuous process and system for decorative ice cream roll forming and manufacturing with variable, automated, and centralized control of the dispensing of selected substantive and decorative ingredients. In this manner an operator can control selected features of the ice cream roll products from a central control panel.

Thus, the present invention is particularly directed to the forming, manufacturing and decorating of a continuous ice cream roll body as contrasted with applicant's co-pending patent application and invention directed to manufacturing separate and discrete ice cream cake and pie specialty ice cream products.

DISCLOSURE OF THE INVENTION

In order to accomplish these results the present invention provides a new machine for manufacturing decorative ice cream rolls. An elongate frame comprising a plurality of ingredient dispensing stations including a plurality of ice cream dispensing stations arranged along the frame. According to a unique feature of the invention an ice cream manifold is mounted on the frame formed with an ice cream inlet for coupling to a continuous flow source of pressurized ice cream. A plurality of outlets are provided for coupling through ice cream distribution lines to ice cream dispensing stations. A conveyor is installed along the length of the frame for conveying a continuous ice cream roll body with substantially uniform motion along the frame and along the respective ingredient dispensing stations from an upstream end of the conveyor to a downstream end.

To support a continuous ice cream roll body on the conveyor, a support tray dispensing station is constructed and arranged for delivering successive adjacent support trays onto the conveyor at the upstream end. The overlapping adjacent support trays support the ice cream roll body for transport on the conveyor along the frame. The ice cream roll body is formed at an ice cream roll body forming station through a roll forming head having at least one ice cream inlet and generally a plurality of ice cream inlets for coupling to continuous flow sources of pressurized ice cream of different flavors. At least one outlet and generally a plurality of outlets deliver a continuous ice cream roll body with at least one arcuate layer and generally a plurality of arcuate layers of ice cream. The ice cream roll body is formed with a generally flat base for sitting on the successive adjacent support trays or chips transported by the conveyor.

According to the invention, at least one ice cream dispensing ice cream wave forming station is provided along the frame. The ice cream wave forming station includes at least one ice cream dispensing tube or nozzle having an inlet for coupling through an ice cream distribution line to the ice cream manifold. A rotating motor is provided to generate the wave form pattern through an eccentric slide coupling which mechanically couples the motor to the ice cream dispensing tube or nozzle. The mechanical coupling or linkage oscillates the ice cream dispensing tube up and down or back and forth producing sinusoidal wave form motion of the ice cream dispensing tube relative to the continuous ice cream roll body moving uniformly along with the conveyor, for dispensing ice cream in a wave form pattern on the ice cream roll body. A feature and advantage of the invention is that the eccentric slide coupling is adjustable for varying the amplitude of the wave form pattern. Furthermore, the rotating motor or wave forming motor is provided with an adjustable speed control for varying the frequency of rotation and therefore the frequency of the wave form pattern.

In the preferred embodiment, at least two ice cream wave forming stations are provided. At the side wave forming station at least one ice cream dispensing tube or nozzle is provided, and preferably two, one on each side of the ice cream roll body. A side motor arrangement is provided with a side eccentric slide coupling mechanically coupling the side drive motor to the horizontally oriented ice cream dispensing tubes or nozzles on either side of the roll forming body. Motion of the horizontally oriented dispensing tubes up and down in a substantially vertically plane dispenses ice cream through the dispensing tubes in a substantially vertical wave form pattern along each side of the moving ice cream roll body.

A top wave forming station is provided with at least one and preferably at least two vertically oriented ice cream dispensing tubes or nozzles. A second top motor arrangement is provided with a top eccentric slide coupling mechanically coupling the top drive motor to the vertically oriented ice cream dispensing tubes or nozzles for motion of the ice cream dispensing tubes laterally back and forth in a substantially horizontal plane. In this manner, the top wave forming station dispenses ice cream through the ice cream dispensing tubes in a substantially horizontal wave form pattern along the top of the moving ice cream roll body.

At the end of the ingredient dispensing stations an ice cream roll body cutting station is located at the downstream end of the conveyor. An ice cream roll body cutter is mounted and arranged for cutting the ice cream roll body into separate ice cream rolls between successive adjacent support trays.

In the preferred embodiment, the roll body cutter comprises a cutting wire which is heated for cutting through the ice cream roll body. An up/down cutting cylinder mounts the cutting wire for motion up and down at an angle from the vertical. The cutting cylinder, which may be for example a pneumatically piloted cylinder, is mounted at an angle from the vertical in the direction of the downstream end of the conveyor in order to compensate for motion of the ice cream roll body on the conveyor during cutting for achieving a vertical cut. Timing signals from a programmed controller hereafter described are operatively coupled to a control solenoid to actuate the cutting cylinder from a starting position for cutting individual ice cream rolls from the continuous roll body between successive adjacent support trays transported on the conveyor. The invention provides a second takeaway conveyor positioned adjacent to the downstream end of the roll body conveyor for receiving individual ice cream rolls cut from the continuous roll body at the roll body cutting station. The takeaway conveyor is operated at a faster speed than the roll body conveyor for removing and separating the individual ice cream rolls.

The cutter in the form of an electrical resistance heated cutting wire may also be mounted on a second lateral pneumatic slide out cylinder operatively coupled for imparting substantially horizontal lateral movement to the cutter away from the ice cream roll body after cutting movement of the cutter in the downward direction, for spacing the cutter from the continuous roll body. A central control, for example a programmed controller, is operatively coupled through electrically piloted control solenoids to the cutting cylinder and slide out cylinder and is programmed for alternating actuation of the cutting cylinder and slide out cylinder to describe a parallelogram pattern or trajectory. The cycle begins with cutting movement of the cutter or cutting wire from a starting position in the downward cutting direction through the ice cream roll body between successive adjacent support trays followed by spacing movement of the cutter wire laterally and horizontally away from the continuous ice cream roll body. The parallelogram course is completed and closed by return of the cutter in the upward direction and then the lateral direction to the starting position.

Additional ingredient dispensing stations according to the invention include a sauce spray dispensing station comprising at least one spray gun for spraying for example chocolate sauce from a heated source of chocolate using atomization air. A spray gun control solenoid opens and closes the spray gun valve for spraying sauce with atomization air when the spray gun valve is open. An ice cream rosette dispensing station includes at least one ice cream dispensing rosette tube having an inlet for operative coupling through an ice cream distribution line to the ice cream manifold. A rosette control solenoid opens and closes a valve at each rosette tube for depositing rosettes on the ice cream roll body.

Other ingredient dispensing stations may include a sauce flow dispensing station provided by a sauce tube and sauce pump. A sauce tube control solenoid controls the sauce tube valve and the flow of sauce from the sauce tube. The invention also contemplates dispensing solids such as nuts, nut pieces, nut fragments, and other solid condiment pieces. The solids dispensing station is formed with a hopper and trough mounted on a vibrator motor. The vibrator motor delivers and dispenses solid pieces from the hopper through the trough onto the continuous ice cream roll body moving uniformly along the conveyor. A solids dispenser control solenoid is used to control turn-on and turn-off of the vibrator motor.

A unique feature of the present invention is the provision of centralized control, timing, and sequencing of the operation of most of the ingredient dispensing stations using for example a programmed controller. The programmed controller is electrically coupled to a bank of electrically piloted control solenoids which includes the spray gun control solenoid, rosette control solenoid, flow sauce tube control solenoid, and solids dispenser control solenoid. The control solenoids are in turn coupled to control the pneumatic or air valves and cylinders at the operating stations for selectively bypassing, actuating, and timing the dispensing of spray sauce, ice cream rosettes, flow sauce, and solid ingredients such as condiments or nuts on the ice cream roll body according to the design of the individual rolls to be cut from the roll body. The central programmed command and control may also be coupled for controlling, timing, and sequencing operation of the support tray dispensing station and the ice cream roll body cutting station. For example, the programmed controller is operatively coupled to the control solenoids for the up/down cutting cylinder and the slide out cylinder for sequencing or controlling the cycle of motion of the heated cutting wire over a parallelogram path.

In the preferred embodiment the ice cream rosette dispensing station comprises first and second ice cream rosette dispensing tubes spaced apart and positioned and arranged one upstream from the other in the direction of the conveyor motion. The rosette tubes or rosette dispensing tubes are generally oriented vertically and are mounted on a slide follower pneumatic cylinder for movement of the rosette tubes in unison following an ice cream roll body on the conveyor upon actuation of the cylinder by the slide follower control solenoid. The programmed controller is operatively coupled to the slide follower control solenoid for actuation of the slide follower cylinder to follow the continuous ice cream roll body. The slide following cylinder is actuated at substantially the same time as actuation of the rosette control valves for opening the rosette tubes and dispensing rosettes from the rosette tubes on the ice cream roll body. A feature and advantage of this arrangement is that the resulting ice cream rosettes may be deposited symmetrically on the ice cream roll body without deformation by relative movement of the ice cream roll body. Thereafter the sauce flow dispensing station can dispense sauce in a depression on the surface of the ice cream roll body between the ice cream rosettes which form ice cream "dams".

The support tray dispensing station also incorporates unique features according to the invention. This station is formed by a column of corner posts for supporting a stack of trays mounted in the column support over the upstream end of the conveyor. The trays are made of flexible material and are supported at the edges or tabs by cross pieces between the column corner posts. A tray dispensing pneumatic cylinder is mounted below the conveyor and the column support. The dispensing cylinder includes at least one arm, and in the preferred embodiment two arms or tines, in the shape of for example a tuning fork extendable above the conveyor on either side of the conveyor to the bottom of the stack of trays mounted in the support column. A vacuum head is mounted at the top end of each fork or tine for engaging the bottom surface of the bottom tray of the stack. The flexible material of the trays permits the trays to be disengaged from the column support upon downward pulling motion by the dispensing cylinder for placement of the tray on the conveyor. By this arrangement successive adjacent trays may be placed on the conveyor for supporting the continuous ice cream roll body, and the ice cream roll body may be cut at the intersection of the overlapping edges or tabs of adjacent trays to provide the separate ice cream rolls.

In the preferred example embodiment of the central control, a programmed controller is provided having a repeating 360° control signal cycle. This programmed controller is electrically coupled to a plurality of or most of the ingredient dispensing stations through electrically piloted control solenoids in turn controlling air cylinders and valves for dispensing of ingredients by programmed control signals at selected degrees during each 360° control signal cycle.

The conveyor includes a conveyor motor operatively coupled to the programmed controller through, for example, a shaft encoder for correlating the speed of the conveyor with the programmed controller cycle. Each 360° control signal cycle of the programmed controller corresponds to and is completed in the length of translation of the conveyor and continuous ice cream roll body corresponding to the length of the individual ice cream rolls to be cut from the ice cream roll body. The programmed controller delivers programmed control signals at selected degrees to the respective control solenoids for the ingredient dispensing stations during each 360° control signal cycle selectively forming and decorating according to the design of the ice cream rolls to be cut from the continuous ice cream roll body.

The ingredient dispensing hardware and tray dispensing and roll body cutting stations may be controlled by a variety of switches, solenoids, cylinders, and valves, etc. The invention contemplates a variety of electrical, mechanical, and pneumatic couplings for achieving the centralized command and control of the ice cream roll forming and decorating process. In this respect, the various switches, solenoids, cylinders, and valves, etc. referred to in the specification and claims, may encompass electrically, magnetically, mechanically, and pneumatically piloted cylinders, valves and solenoids, and cylinders, valves and solenoids which control electrical, magnetic, mechanical, and pneumatic energy and power sources for implementing and operating the ingredient dispensing and operating stations.

Furthermore, the central command and control of ingredient dispensing and operating stations may be implemented by a variety of programmable central controls. While the preferred example embodiment is described with reference to a programmable controller, microprocessors and other programmable processors or control signal path circuits may also be used. Overall, the invention provides flexible and variable central control over the design, forming, decoration, and manufacture of decorative ice cream rolls in a continuous process building on a continuous ice cream roll body subsequently cut into the separate and individual rolls. Other objects, features, and advantages of the invention are apparent in the following specification and drawings.

BRIEF DESCRIPTION OF THE DRAWINGS

FIG. 2 is a fragmentary detailed perspective view of the Station 1, the support tray dispensing station, at the upstream end of the conveyor.

FIG. 2A is a side view and FIG. 2B is a plan view from above of the support trays placed in overlapping relationship on the conveyor for transporting the continuous ice cream roll body.

FIG. 2C is a diagrammatic perspective view of the support tray dispensing mechanism for dispensing and placing support trays on the conveyor.

FIG. 10 is a detailed fragmentary perspective view of Station 6 showing the pair of rosette tubes for depositing ice cream dam rosettes on the top of the continuous ice cream roll body.

FIG. 11 is a detailed front view of the ice cream manifold mounted on the machine frame for distributing continuous flow of pressurized ice cream to a plurality of ice cream dispensing stations.

FIG. 12 is a detailed fragmentary perspective view of Station 7, the sauce tube for delivering a flow of sauce onto the ice cream roll body.

DESCRIPTION OF PREFERRED EXAMPLE EMBODIMENTS AND BEST MODE OF THE INVENTION

Figure 1:
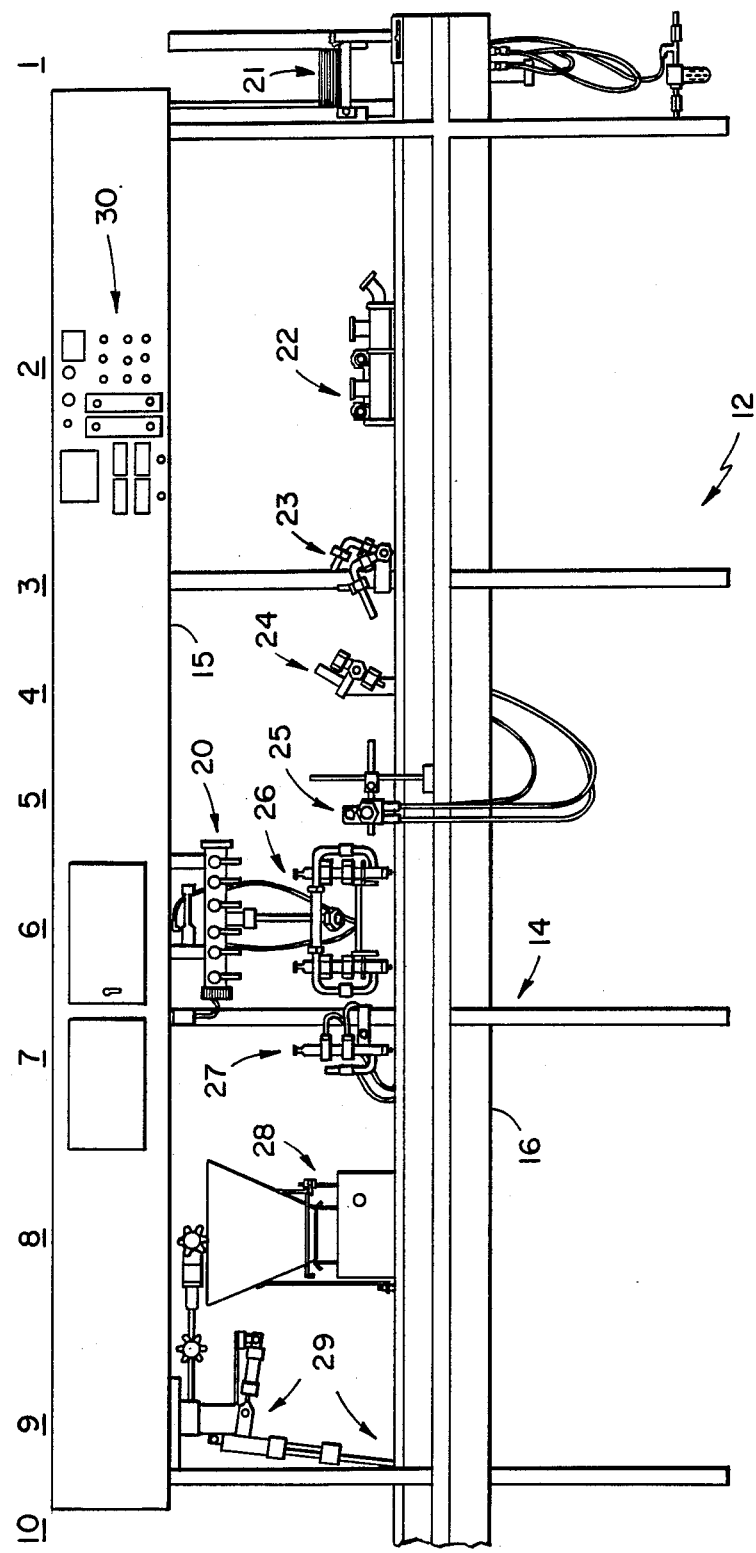
FIG. 1 is a diagrammatic front view of the system apparatus for manufacturing decorative ice cream rolls according to the invention showing the machine frame with ten ingredient dispensing and ingredient processing or operating stations distributed along the frame and conveyor.

A machine or manufacturing system 12 for manufacturing decorative ice cream rolls according to the invention is illustrated in FIG. 1. In this example, 10 sequential ingredient dispensing, processing or operating stations designated by the underscore numerals 1 through 10 are mounted in a row and supported on the elongate frame 14. The frame 14 includes an upper level cabinet 15 which houses most of the operating controls including control solenoids and the motors for operating the respective ingredient dispensing and processing stations 1 through 10. The frame also includes a lower level or support level 16 which contains the elongate track surface and conveyor described hereafter for conveying a continuous ice cream roll body with uniform motion along the frame and the hardware for the ingredient dispensing and processing or operating stations 1 through 10.

The ingredient dispensing stations, ingredient processing stations and operating stations 1 through 10 and corresponding ingredient dispensers or other processing or operating equipment of FIG. 1 are summarized in Table I. Briefly, a tray or chip dispenser 21 mounted at support tray dispensing station 1 delivers successive adjacent support trays onto a roll body conveyor, not visible which is seated in the upper surface of frame level 16 and extends the length of the frame.

The ice cream roll forming head 22 at ice cream roll body forming station 2 forms the inlet ice cream into arcuate layers and delivers a continuous roll body typically of multiple arcuate layers of ice cream of different flavor onto the successive adjacent trays transported by the conveyor. The side ice cream wave forming dispenser 23 and the top ice cream wave forming dispenser 24 at the respective side ice cream wave forming station 3 and top ice cream wave forming station 4 add decorative ice cream waves to the ice cream roll body and can also be used at higher frequency to build up the roll body by forming additional ice cream layers.

Spray guns 25 selectively spray decorative chocolate at selected locations on the roll body from sauce spray dispensing station 5. The ice cream rosette dispensing station 6 uses an ice cream rosette dispenser 26 with a pair of ice cream rosette dispensing tubes as hereafter described. The sauce flow tube 27 at sauce flow dispensing station 7 controls and delivers the flow of sauce through the tube to a depression in the roll body formed between the ice cream rosette dams deposited by the rosette dispenser 26.

The decorative ice cream roll manufacturing system also provides a solids dispensing station 8 with a nut or condiment solids dispenser 28 using a hopper, trough and vibratory motor. Upon completion of the dispensing and processing of ingredients forming and decorating the ice cream roll body, individual lengths corresponding to separate ice cream rolls are cut from the continuous roll body by cutter 29 at the ice cream roll body cutting station 9. Finally, a separate take away conveyor not visible at the downstream end of the continuous roll body conveyor and frame level 16 receives and engages the individual ice cream rolls conveying them away at a speed faster than the continuous roll body conveyor for packaging. This is accomplished at the final takeaway station 10 beyond the downstream end of the roll body conveyor at frame level 16.

Other features of interest shown in the diagrammatic view of the decorative ice cream roll forming system 12 of FIG. 1 is the control panel 30 mounted on the upper level cabinet 15 of the ice cream roll machine 12. As hereafter described various motors, control solenoids and other control features of the operation of the system are housed in the upper level cabinet 15 of the frame 14. As shown in FIG. 1 the control panel 30 is conveniently located for access by an operator for example between stations 2 and 3. Also shown in FIG. 1 is the ice cream manifold 20 which receives ice cream from a continuous pressurized source for distribution through a plurality of outlets to various ice cream dispensing stations along the lower level 16 of the frame 14.

TABLE I

| STATION | FUNCTION/EQUIPMENT |
| --- | --- |
| 1 | Support tray dispenser (21) |
| 2 | Roll forming head (22) |
| 3 | Side wave forming dispenser (23) |
| 4 | Top wave forming dispenser (24) |
| 5 | Spray sauce dispenser (25) |
| 6 | Rosette dispenser (26) |
| 7 | Flow sauce dispenser (27) |
| 8 | Solids dispenser (28) |
| 9 | Roll cutter (29) |
| 10 | Take away conveyor (30) |
| Between 2 and 3 | Control panel (30) |
| Between 5 and 7 | Ice cream manifold (20) |

The elements of station 1 are shown in further detail in FIG. 2. The support tray dispenser 21 includes a column support or cartridge 34 provided by four corner posts 35 for containing, guiding and supporting a stack of trays 36 which rest along the edges of the trays 36 on cross pieces 38 between corner posts 35. As shown in FIGS. 2A and 2B the trays 36 are formed with border edges or tabs 40 of flexible bendable material such as plastic and a base 42 which may be formed in a slight depression for receiving an individual ice cream roll cut from the continuous roll body.

A tray dispensing cylinder 44 such as a pneumatically piloted cylinder is positioned below the conveyor and below the column support or cartridge 34. The dispensing cylinder is formed with an extended piston arm 45 formed with at least one tine or fork and preferably a pair of tines 46 and 48 extendable above the conveyor 50 with sufficient length to reach the bottom of the stack of trays 36 mounted in the column support 34. As shown in FIG. 2C the piston arm 45 with extending tines 46 and 48 associated with the dispensing cylinder 44 has the appearance of a tuning fork with two tines or forks which rise on either side of the chain conveyor 50 in order to reach the trays.

Vacuum head 52 and vacuum head 54 are mounted respectively at the ends of the tines or fork arms 46 and 48 for engaging the bottom surface of the bottom tray of the stack of trays 36. By way of example each of the vacuum heads 52 and 54 is in the configuration of a cylinder with three vacuum holes or suction holes 55 along the top surface. A vacuum is applied to the vacuum head suction holes 55 from a vacuum source 47. The vacuum heads or suction heads 52 and 54 engage the bottom tray 36 and pull it downward within the guide posts 35 of the support cartridge 34. The flexible edges or tabs 40 bend so that the bottom tray 36 is released by the cross pieces 38. With further downward movement of the piston arm 45 and tines 46 and 48 the tray 36 is deposited on the top of the chain conveyor 50 where flights or lugs 64 on the chain conveyor 50 engage the recessed end 56 of the tray 36 transporting it along the conveyor. The pneumatic cylinder 44 and vacuum source 47 are controlled by electrically piloted control solenoids and the programmed controller hereafter described with reference to FIGS. 16, 16A and 16B.

Figure 3:
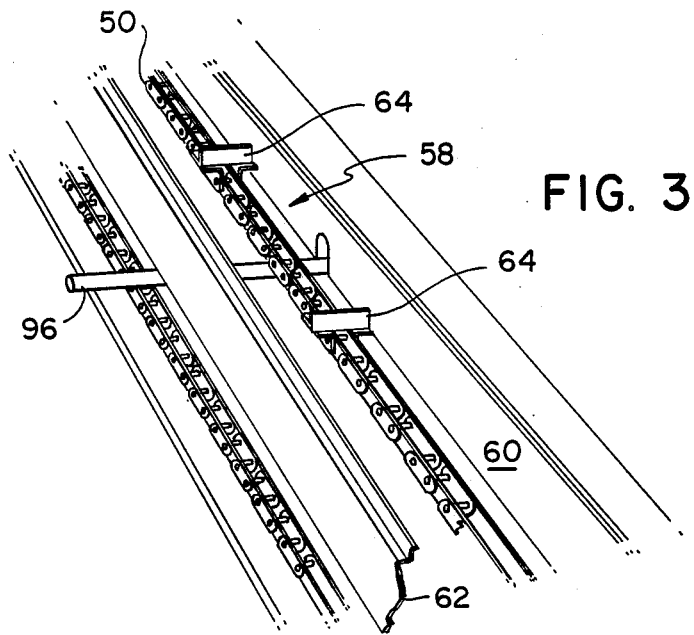
FIG. 3 is a detailed fragmentary perspective view of the chain conveyor with flights for transporting the support trays and continuous roll body with uniform motion along the length of the frame.

As shown in FIG. 3 trays seated on the chain conveyor 50 and transported along the lower level 16 of the frame 14 enter a guide way 58 defined by side surfaces 60 and 62 which guide the trays 36 in the guide way or track 58 as the trays are transported along the chain conveyor 50 by flights 64. The chain conveyor 50 is provided by an endless chain and returns below the guide way 58 as illustrated in FIG. 3, driven by a conveyor drive motor mounted in upper level cabinet 15 as hereafter described.

According to the invention, the trays are deposited on the chain conveyor 50 and transported by flights or lugs 64 so that the tabs or edges 40 at the ends of the trays overlap in contiguous relationship. As a result the successive adjacent trays 36 transported along the chain conveyor 50 present a continuous base support upon which is deposited and supported the continuous roll body for transport by the conveyor along the guide way 58 recessed in the upper surface of the lower level 16 of frame 14. During the continuous transport in the guide way or track 58 the continuous ice cream roll body is processed by subsequent ingredient dispensing and processing stations for producing the decorative ice cream rolls.

Figure 5:
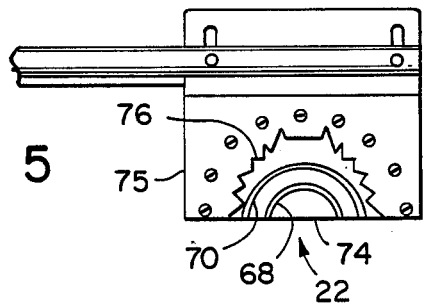
FIG. 5 is a fragmentary plan view from the end of the roll forming head of FIG. 4 showing a saw-tooth peripheral border for shaping the outer surface of the continuous roll forming body.
Figure 4:
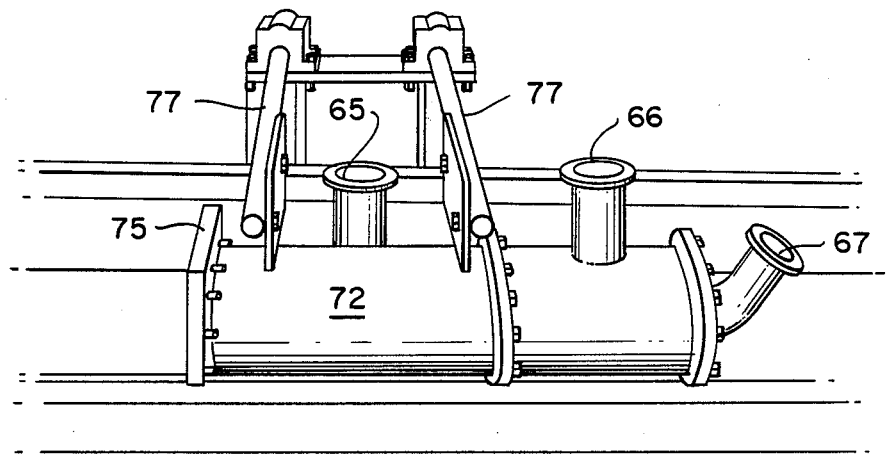
FIG. 4 is a detailed perspective view of Station 2, the ice cream roll forming station and ice cream roll forming head.

The ice cream roll forming head 22 which is the operative element of station 2 is shown in detail in FIGS. 4 and 5. In the example of FIGS. 4 and 5 the roll forming head 22 forms a continuous ice cream roll body having three arcuate layers of ice cream for example of three different ice cream flavors which are delivered to the roll forming head through the three ice cream inlets 65, 66 and 67. At each of the inlets is coupled a tube which delivers a continuous flow of ice cream from a refrigerated and pressurized source of ice cream. The head itself provides three arcuate channels or grooves defined by three substantially parallel spaced apart arc shaped walls or surfaces 68, 70 and 72 each secured to the flat base 74. The three ice cream inlets communicate respectively with the arcuate spaces defined between the respective arc shaped surfaces. Thus ice cream inlet 67 delivers ice cream of one flavor to the inner arcuate layer space defined between the arc shaped surface 68 and the base 74. Ice cream inlet 66 delivers a second ice cream flavor to the intermediate arcuate layer space defined between arc shaped surfaces 68 and 70. Ice cream inlet 65 delivers ice cream of yet a third flavor to the outer arcuate layer space defined between arc shaped surfaces 70 and 72.

It is apparent that a roll forming head can be provided with only one or two arcuate surfaces secured to the base for forming ice cream roll bodies of only one or two arcuate layers. Similarly a greater number of surfaces can be provided for forming more arcuate layers. Thus, different roll forming heads may be substituted according to the design of the ice cream roll.

As the pressurized ice cream is delivered to the three layer spaces, the layers merge into a continuous ice cream roll body of three arcuate layers of ice cream as the ice cream extrudes from the front of the roll forming head. In order to achieve further decorative effects a mask 75 may be placed over the outlet end of the roll forming head 22 for shaping the outer surface of the ice cream roll. In the example of FIG. 5 a mask 75 with a saw tooth edge 76 is placed over the outlet end of the roll forming head with the saw tooth periphery over the peripheral edge of the outer surface 72. As a result the ice cream roll body is extruded with saw tooth rigids over the outer arcuate layer of ice cream for decorative or aesthetic effect. For example, the Deering Ice Cream Corp. Williamsburg TM french vanilla and black raspberry ice cream roll, Saratoga TM old fashion vanilla, strawberry and chocolate ice cream roll, and Kitzbuhel TM chocolate marshmallow ice cream roll among others all use the saw tooth mask for saw tooth shaping of the surface of the outer layer of ice cream.

As shown in FIG. 4 the roll forming head 22 is supported over the chain conveyor 50 and the successive adjacent trays transported on the roll conveyor by the horizontal support rods 77 extending from frame elements of the lower level 16 of frame 14. The continuous roll body is deposited on the successive adjacent trays from the outlet end of the suspended roll forming head.

Figure 6:
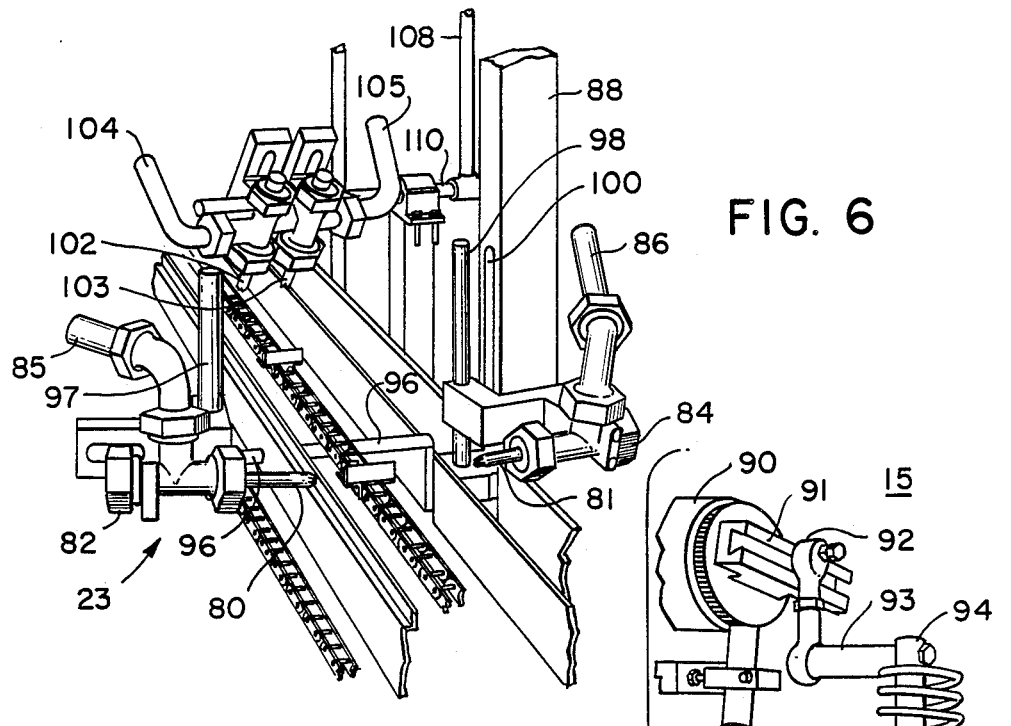
FIG. 6 is a detailed fragmentary perspective view of Stations 3 and 4, the ice cream wave forming stations, showing in sequence the side wave forming station and the top wave forming station respectively.
Figure 7:
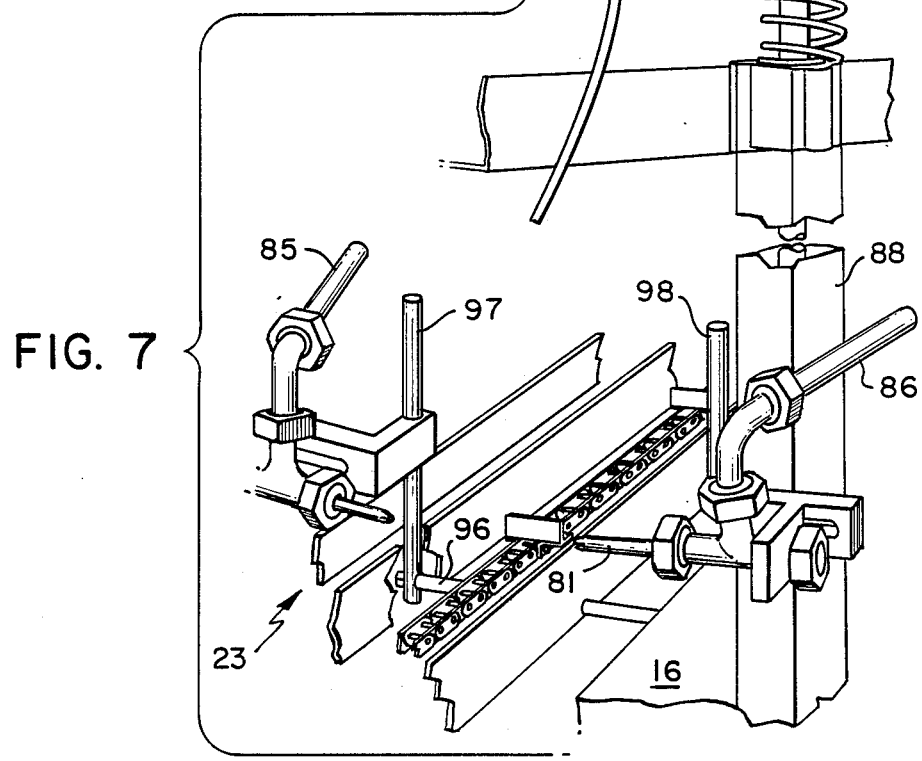
FIG. 7 is a detailed diagrammatic perspective view of Station 3 showing the side wave form ice cream decorating tubes and the side wave motion driving mechanism.
Figure 8:
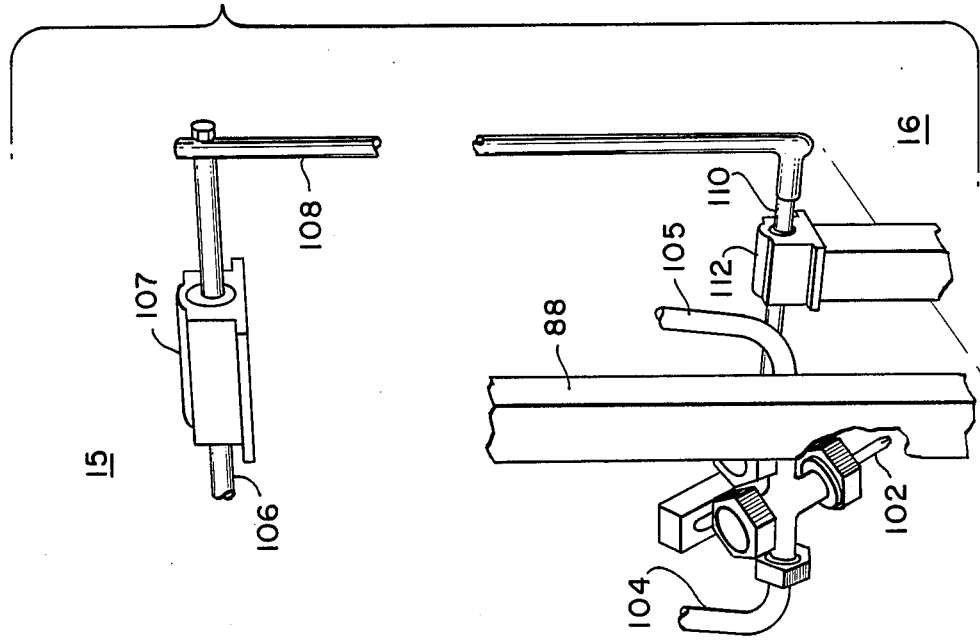
FIG. 8 is a detailed fragmentary perspective view of Station 4 showing the top ice cream wave forming tubes and the top wave motion drive mechanism.

The ice cream wave forming stations 3 and 4 are shown in further details in FIGS. 6 through 8. The side wave forming station 3 and side wave form dispenser 23 includes a pair of rosette type ice cream dispensing tubes 80 and 81 mounted on supports which may include manual valves 82 and 84 through which ice cream is delivered through ice cream inlets 85 and 86. The ice cream inlets 85 and 86 are coupled by flexible ice cream distribution lines not shown to the ice cream manifold hereafter described for delivering continuous flows of ice cream under pressure to the dispensing tubes 80 and 81. The dispensing tubes 80 and 81 deliver decorative ice cream wave form patterns along the sides of the continuous ice cream roll body as it moves uniformly along the conveyor on level 16 of frame 14.

The side wave form dispenser 23 is shown in further detail in the fragmentary illustration of FIG. 7. Referring to both FIGS. 6 and 7, the wave form pattern is achieved by imparting vertical oscillations or periodic up and down motion to the dispensing tubes 80 and 81. This is accomplished by an oscillating drive contained within the hollow rectangular post 88 at the back of the frame 14. The hollow post 88 extends between the upper level cabinet 15 of frame 14 which houses the motors and various controls and the lower level 16, the actual manufacturing level for forming and decorating the continuous ice cream roll body.

Mounted in the upper level cabinet 15 is the side wave forming motor 90, a DC motor whose speed of rotation or frequency is controlled by a motor speed controller hereafter described with reference to FIGS. 16, 16A and 16B which controls the armature voltage to the DC motor. An eccentric slide drive arrangement is mounted on the side of motor 90 and vertically oriented for converting the rotary motion of motor 90 into reciprocal up and down motion or vertical oscillations. This is accomplished by the coupling slide 91 and eccentric cam 92 positioned eccentrically within the slide 91 converting the rotary motion of motor 90 to the reciprocal vertical oscillations of the side wave forming drive rod 94 through linkage 93. The reciprocal oscillatory motion of side wave forming drive rod 94 is stabilized within the column post 88 by spring 95. The large spring 95 cushions the stroke of side wave forming drive rod 94 and evens out the resistance for constant speed of the vertical oscillatory motion.

The drive rod 94 is coupled to the side wave form ice cream dispensing tubes 80 and 81 by means of a cross rod 96 to which the ice cream dispensing tubes 80 and 81 are rigidly connected through their respective supports and connecting posts 97 and 98. The cross rod 96 is rigidly connected to the vertically reciprocating drive rod 94 through the slot 100 formed on the inside of post 88 to accommodate the oscillatory up and down motion of cross rod 96. The cross rod 96 is in turn rigidly coupled to the supports for side wave forming ice cream dispensing tubes 80 and 81 through connecting rods 97 and 98.

A digital tachometer 99 including a ribbed disk and sensor is mounted at the shaft of motor 90 for monitoring motor speed and wave form frequency. This information is displayed on the control panel as hereafter described.

The top ice cream wave forming station 4 is illustrated in further detail in FIGS. 6 and 8. Ice cream is dispensed in wave form patterns on the top of the continuous ice cream roll body by generally vertically oriented rosette type ice cream dispensing tubes 102 and 103 which similarly may be provided with manual control valves for passing continuous source flow of pressurized ice cream through respective inlets 104 and 105. The ice cream inlets 104 and 105 are connected through flexible ice cream distribution lines not shown to the ice cream manifold hereafter described.

Oscillatory motion back and forth or to and fro in a generally horizontal or lateral direction is imparted to the top wave forming ice cream dispensing tubes 102 and 103 by a second top wave forming motor, not shown, similar to the side wave forming motor 90 but oriented vertically. Thus, the slide eccentric drive coupling is oriented horizontally, for example, positioned on the top of the motor for translating the rotary motion into a horizontal to and fro or back and forth motion. This is transmitted by appropriate linkages to the lateral top wave form drive rod 106 through linear bearing 107 to connecting rod 108 which extends between the upper level cabinet 15 on frame 14 where the top drive motor is located and the lower level 16 of frame 14 where the ingredient dispensing and manufacturing operations are located. At the lower level 16 the top ice cream wave forming dispensing tubes 102 and 103 through respective supports are mounted on a second auxiliary lateral or horizontal drive rod 110 coupled to connecting rod 108 through linear bearing 112.

At both the side ice cream wave forming station 3 and the top ice cream wave forming station 4 the frequency of the wave forms may be varied by controlling the speed of the respective side wave forming motor 90 and top wave forming motor as hereafter described with reference to FIG. 16, 16A and 16B. Furthermore the amplitude of the ice cream wave form patterns may be varied by adjusting the eccentricity of the cam of the eccentric slide drive. For example as shown in FIG. 7 the eccentricity or amplitude of the sliding motion of cam 92 within slide 91 may be varied to change the amplitude of the oscillations and corresponding ice cream wave form patterns formed on the continuous ice cream roll body moving with uniform motion past the ice cream wave forming stations.

A feature and advantage of the side and top ice cream wave forming stations 3 and 4 is that the frequency may be increased relative to the uniform motion of the continuous ice cream roll body so that the adjacent wave lines are contiguous effectively forming yet another layer of ice cream over the ice cream roll. Thus, the ice cream wave forming dispensers 23 and 24 may be used not only for depositing decorative wave form patterns on the roll body but also for building up another full layer of ice cream.

In typical operation the chain conveyor 50 and conveyor drive motor hereafter described are operated with a conveyor speed of approximately 20 to 22 ice cream roll lengths per minute where the ice cream roll lengths constitute 9 to 10 inches (22 to 25.4 cm). The side and top ice cream wave decorating motors are adjusted for operation in the range of 160 to 180 RPM or cycles per minute and typically 175 RPM. With a conveyor speed and continuous ice cream roll body speed of approximately 20 ice cream roll lengths per minute of 10 inch (25.4 cm) roll lengths, approximately 8 to 9 ice cream waves are formed in a wave pattern along each roll length by the ice cream wave forming dispensing tubes.

When using the side and top ice cream dispensers 23 and 24 for laying down another layer of ice cream of contiguous wave lines over the continuous roll body, the speed of rotation of the side and top wave decorating motors is increased to run in the range of for example 300 to 350 cycles per minutes or RPM's. At the same time the conveyor speed may be slightly reduced. With these parameters the sides of the ice cream roll and the top of the ice cream roll are built up with contiguous wave lines forming another layer over the entire surface, for example, as used on the Deering Ice Cream Corp. Windsor TM chocolate parfait ice cream roll.

Figure 9:
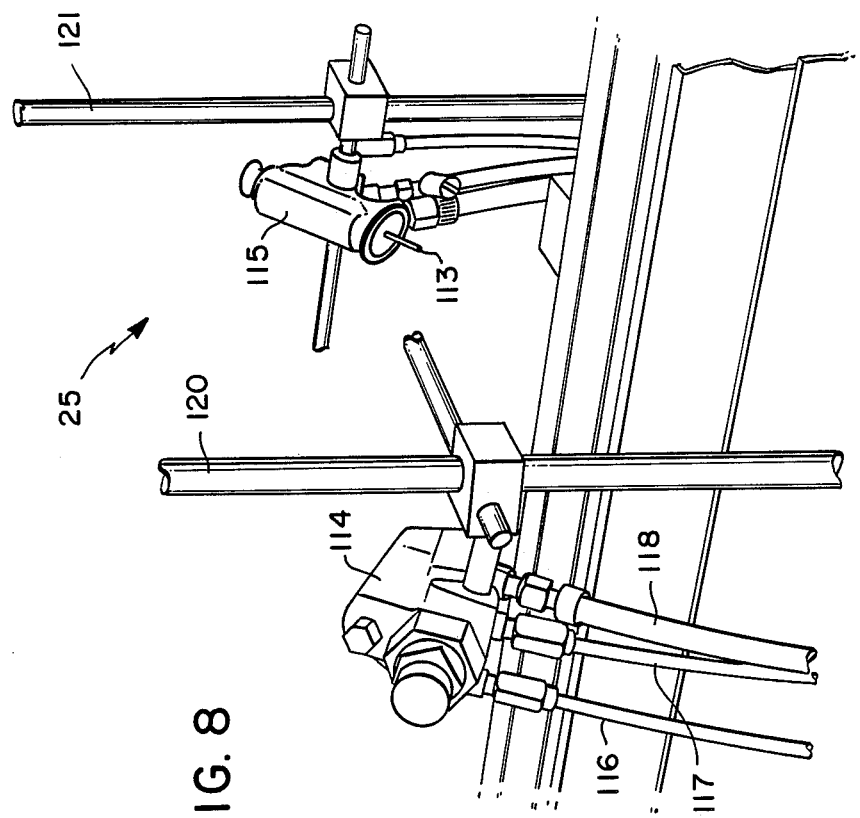
FIG. 9 is a detailed fragmentary perspective view of Station 5 showing the pair of spray guns for spraying heated chocolate with atomized air.

The spray sauce dispenser 25 at station 5 is shown in further detail in FIG. 9. This spray sauce dispensing station 5 includes two spray guns, 114 and 115. The spray guns are of the pin nozzle type similar to paint spray guns but of course of stainless steel for food handling. The spray guns 114 and 115 have three inputs, namely an on/off control from a control solenoid, and two valves one for heated chocolate sauce and the other for atomization air for atomization air spraying of the chocolate sauce onto the ice cream roll body.

Referring to spray gun 114, each spray gun includes a pneumatic input line 116 from an on/off control solenoid hereafter described with reference to FIGS. 16, 16A and 16B for opening and closing the spray gun nozzle. This is accomplished by extension and withdrawal of the pin 113 in the pin type nozzle. Thus, the spray guns 114 and 115 are turned on and off by the air pressure signals on lines 116 from the on/off control solenoid which is in turn actuated by signals from a centralized programmed controller as hereafter described with reference to FIGS. 16, 16A and 16B. Atomization air from a separate heated supply of pressurized sanitary air is input on line 117 for atomization spraying of heated chocolate delivered from a separate tank of heated chocolate on line 118.

Because the nozzles of the spray guns tend to plug up, the nozzles are cleared each ice cream roll length of the continuous ice cream roll body by briefly shutting off the spray gun thereby inserting the pin 113 through the nozzle clearing the nozzle. By way of example, the programmed controller may be selected to operate on a 360° cycle for each length of ice cream roll for example 10 inches (25.4 cm) long. For clearing the nozzle the gun may be shut off by a signal from the programmed controller for example for only one to two degrees of each cycle and thereby prevent plugging of the nozzle.

The spray guns 114 and 115 are supported on posts 120 and 121 which may for example also support another pair of spray guns on the other side of the posts. The control system as hereafter described is also adapted for handling more than one pair of spray guns.

The ice cream rosette dispenser 26 and ice cream rosette dispensing station 6 are described with reference to FIGS. 10 and 1. The rosette dispenser includes a pair of standard ice cream dispensing nozzle tubes 124 and 125 spaced apart in the direction of travel of the conveyor 50 for depositing a pair of ice cream rosettes spaced apart along the top of each ice cream roll length of the continuous ice cream roll body. A continuous flow of pressurized ice cream is delivered to the rosette dispensing tubes 124 and 125 through the inlet manifold 126 which is in turn coupled through inlet coupling 128 through a flexible ice cream distribution line to the ice cream manifold 20 hereafter described with reference to FIG. 11. Each ice cream rosette dispensing tube 124 and 125 is also fitted with an on/off control solenoid valve 130 and 131. Each on/off control solenoid valve 130 and 131 is controlled by timing signals from the programmed controller as hereafter described for opening the ice cream dispensing tubes 124 and 125 at proper intervals for forming the ice cream rosettes.

The pair of rosette dispensing tubes 124 and 125 are mounted on a common support to an up/down pneumatic cylinder 132 illustrated in FIG. 1. The up/down cylinder 132 under the control of an electrically piloted control solenoid and the programmed controller extends the pair of rosette tubes for extruding or depositing a pair of ice cream rosettes at the proper location of each ice cream roll length. The pair of rosette dispensing tubes is retracted on the piston arm 134 of cylinder 132 between dispensing operations so that it does not interfere with the continuously moving ice cream roll body.

In order to accommodate and match the uniform motion of the continuous ice cream roll body during extrusion or deposition of ice cream rosettes on each ice cream roll length, the rosette tube pair on its common mount on piston arm 134 and up/down control cylinder 132 is in turn mounted on a pneumatic slide shuttle cylinder also under control of an electrically piloted control solenoid 135. Because the ice cream rosettes are formed and deposited quickly in a short time interval, the slide shuttle cylinder 135 requires only a short stroke of, for example, 2 inches (5 cm). Both the up/down cylinder 132 and the slide shuttle cylinder 135 are controlled by timed signals from the programmed controller through the control solenoids for briefly following the continuous ice cream roll body during a specified interval of each ice cream roll length affording sufficient time to deposit the ice cream rosettes while the rosette dispensing tubes 124 and 125 are traveling at the same speed as the ice cream roll body.

According to a feature of the present ice cream roll forming and manufacturing process, the ice cream rosettes are deposited symmetrically along the top of each ice cream roll length forming ice cream dams at the ends of a central depression in the top of the ice cream roll body. This central depression may be formed for example by the mask 76 at the outlet end of the roll forming head 22 as shown in FIG. 5 and may also be accentuated by the top ice cream wave form patterns on either side of the central depression along the top of the continuous ice cream roll body. This central depression may then be filled with confectionary sauce from the flow sauce dispenser 27 at flow sauce dispensing station 7 shown in further detail in FIG. 12.

The flow sauce dispenser 27 may be provided by a dispensing nozzle tube 138 similar to the standard ice cream dispensing tube nozzles 124 and 125 of FIG. 10 but used for pumping sauce instead of ice cream. A double acting air valve or pneumatic solenoid valve 140 opens and closes the sauce dispensing tube 138 in response to signals from the programmed controller. When the sauce dispensing tube 138 is opened for a selected interval by valve 140, a selected volume of confectionary sauce under pressure from a hopper and pump flows through the dispensing tube 138 into the depression on the top of each ice cream roll length of the continuous ice cream roll body. The flow sauce tube 138 is mounted on a support post 142 of the frame 14.

The ice cream manifold 20, according to the invention, mounted between stations 5 and 7 includes an inlet manifold 144 of larger diameter for example 1½-2 inches (3.8-5 cm) in diameter with an inlet opening for coupling to a source of continuously flowing pressurized ice cream, typically of vanilla flavor ice cream. The manifold 20 also includes a plurality of ice cream outlets 145 of smaller diameter, for example 1 inch (2.5 cm) in diameter, each controlled by a manual on/off control valve 146. By this arrangement, a larger volume flow of inlet ice cream may be divided and distributed through a plurality of ice cream distribution lines from the ice cream outlets, for example six in number in the example of FIG. 11, to a plurality of different ice cream dispensing stations. For example, in the system of FIG. 1, two of the ice cream outlets 145 from ice cream manifold 20 are coupled to the side ice cream wave form dispensing tubes at station 3, two of the ice cream outlets 145 are coupled to the top ice cream wave forming dispensing tubes of station 4, and two of the ice cream outlets 145 of ice cream manifold 20 are coupled to the two rosette dispensing tubes of station 6. In FIG. 11 the up/down control solenoid 135 for the rosette dispenser 26 can be seen behind the ice cream manifold 20.

Figure 13:
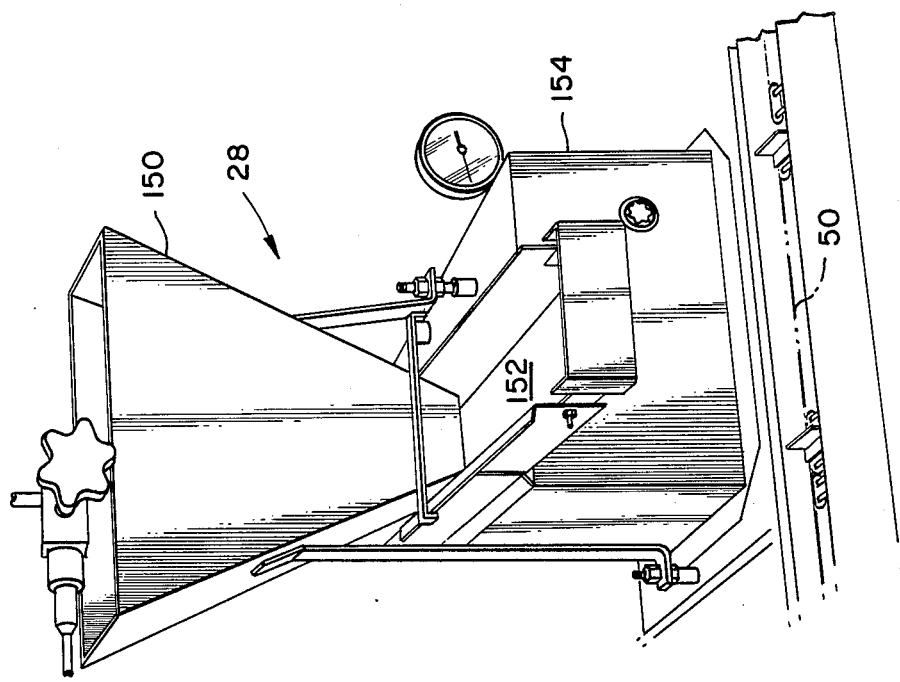
FIG. 13 is a detailed fragmentary perspective view of Station 8, the solids dispensing station and the solids dispenser for dispensing nuts or other solid condiment pieces.

The ice cream roll manufacturing machine 12 also provides a solids dispenser 28 such as a nut dispenser at the solids dispensing station 8 shown in further detail in FIG. 13. The basic elements of the solids dispenser 28 include a hopper 150 for receiving and storing solids for dispensing such as nuts, nut fragments or nut pieces, or any of a variety of confectionary or candy solids or fragments. The solids dispenser 28 also includes a trough or dispensing guideway 152 below the hopper and a vibrator motor 154 on which the hopper 150 and trough 152 are mounted for vibration dispensing of the solids. The on/off switch such as a control solenoid switch of the vibrator motor may be controlled by the programmed controller as hereafter described for vibration dispensing of nut pieces or other confectionary solid pieces at selected intervals along each ice cream roll length of the ice cream roll body.

The solids dispenser 28 at station 8 and the sauce flow dispenser 27 at station 7 may be used in the alternative for dispensing either sauce or nuts for example along the top of each ice cream roll length. Alternatively. they may be used in combination. Furthermore, the scope or spread of the dispensing of solids over the surface of each ice cream roll length may be controlled by the size or shape of the opening at the end of the trough or guideway 152.

Figure 14:
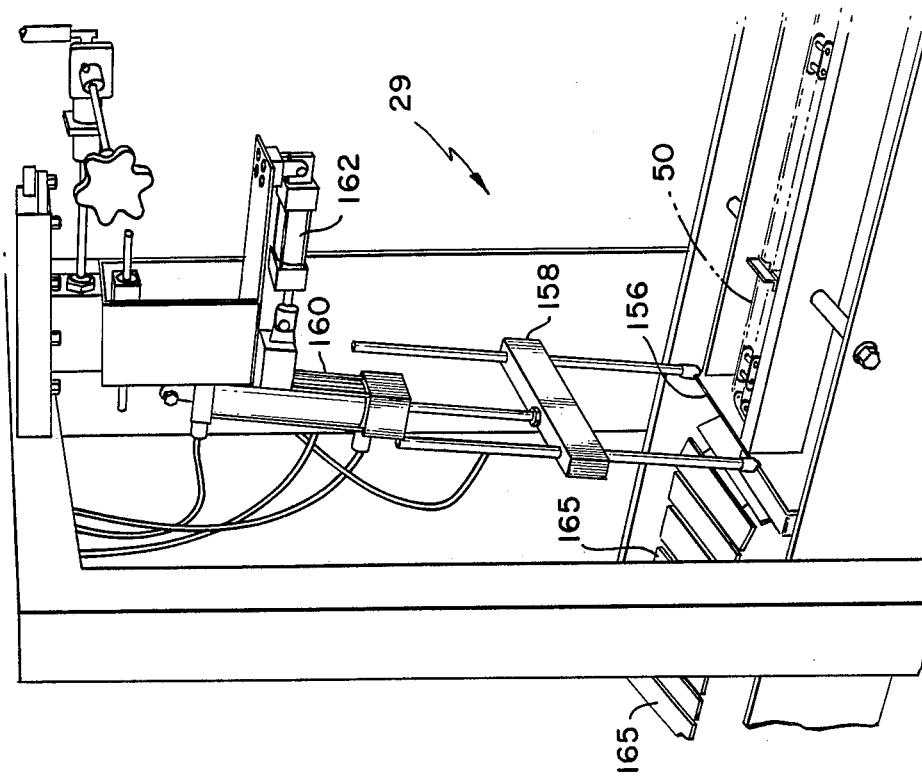
FIG. 14 is a detailed fragmentary perspective view of Station 9, the ice cream roll body cutting mechanism for cutting the continuous ice cream roll body into uniform ice cream roll lengths followed by Station 10, the "takeaway" conveyor.

Upon completion of the forming and decoration of each ice cream roll length of the continuous ice cream roll body moving with uniform motion along the conveyor 150 and processing level 16, the individual ice cream rolls are cut from the continuous roll body by the roll cutter 29 at roll cutting station 9 illustrated in further detail in FIG. 14. The actual roll cutter or roll cutting element is a heated wire 156, for example an electrical resistance wire such as Nichrome TM wire, which is electrically heated to facilitate cutting through the frozen and refrigerated continuous roll body. The heating element 156 is mounted on an appropriate cutting frame 158 in turn mounted on the generally vertically oriented pneumatic cutting cylinder 160. The cylinder 160 imparts up and down motion to the heating element cutting wire 156 for severing predetermined lengths of the continuous ice cream roll body. The cylinder 160 is for example a pneumatically piloted double acting non-rotating cylinder and piston with a 6-inch (15 cm) stroke. The pneumatic air signals to the cylinder 160 are in turn imparted by an electrically piloted solenoid under the control of the programmed controller hereafter described.

In order to accommodate and compensate for the uniform motion of the continuous ice cream roll body during motion of the cutting wire 156 through the roll body, the cutting wire 156, mounting frame 158, and cylinder 160 are positioned at an angle to the vertical in the direction of motion of the conveyor 50. To accommodate the typical speed of the conveyor of, for example, 20–22 roll lengths per minute of ice cream roll lengths of 9–10 inches (22–25.4 cm), a mounting angle and cut travel angle of approximately 20° from the vertical may be used to compensate for the roll speed and achieve a substantially vertical cut.

The entire cutter frame 158 and up/down cylinder 160 are mounted on a horizontally or laterally oriented pneumatic slide out or kick out cylinder 162. At the end of the cut through the continuous ice cream roll body which occurs at the end of the length of the conveyor 50 at the end of station 9, the slide out cylinder 162 is actuated moving the cutting wire 156 laterally away from the continuous ice cream roll body for return or recovery of the cutting wire to the starting position. Furthermore, during slide out of the cutting wire 156 and frame 158 laterally away from the continuous ice cream roll body, there is no interference or contact with the recently cut ice cream roll length because of the operation of the takeaway conveyor 165 which constitutes station 10 of the machine.

The takeaway conveyor 165, for example a plastic tabletop belt conveyor, operates at a faster speed than the roll body conveyor 50, for example at a one-third greater speed. As a result, the recently cut ice cream roll length is whisked away from the ice cream roll body by the takeaway conveyor and cleared from the recovery motion of the cutting wire 156 and cutting frame 158. The takeaway conveyor 165 is preferably positioned a little lower or slightly below the level of the roll body chain body conveyor 50 so that the recently cut ice cream roll length or ice cream roll length undergoing cutting separation does not hit or touch the takeaway conveyor 165 until the cut is substantially completed. The plastic tabletop belt conveyor 165 then pulls away the recently cut ice cream roll length as the cutting wire 156 reaches the bottom of the cut.

The slide out cylinder 162 is similarly a pneumatically piloted double acting cylinder and piston and the pneumatic air signals to the slide out cylinder 162 are controlled by an electrically piloted solenoid under control of the programmed controller. Upon actuation of the slide out cylinder 162 the cutting wire 156 and frame 158 are spaced clear from the ice cream roll body and the cylinder 160 is then actuated to retrieve the cutting wire 156 and frame 158 in the upward direction. The double acting slide out cylinder 162 is then actuated to return the cutting wire 156 and frame 158 to the starting position for cutting the next ice cream roll length. Thus, the cutting wire 156 under control of the alternately actuated cylinders 160 and 162 follows a generally parallelogram path during successive cuts severing the ice cream roll lengths with substantially vertical cuts.

The operation and operating system of the ice cream roll manufacturing machine 12 according to the present invention is described in further detail with reference to the control panel diagram of FIG. 15 and the operating system block diagrams of FIGS. 16, 16A, and 16B. The heart of the operating and control system for the decorative ice cream roll manufacturing machine is a programmed controller (PC) 180 which controls through electrical timing signals the operation of most of the ingredient dispensing stations. The programmed controller is described with reference to FIGS. 16A and 16B. Three of the ice cream dispensing stations, station 2, station 3, and station 4, operate continuously however and are therefore manually controlled and not incorporated in the command and control by the programmed controller. The operation and control of these three dispensing stations, 2, 3, and 4, are described with reference to FIGS. 15 and 16.

Figure 16:
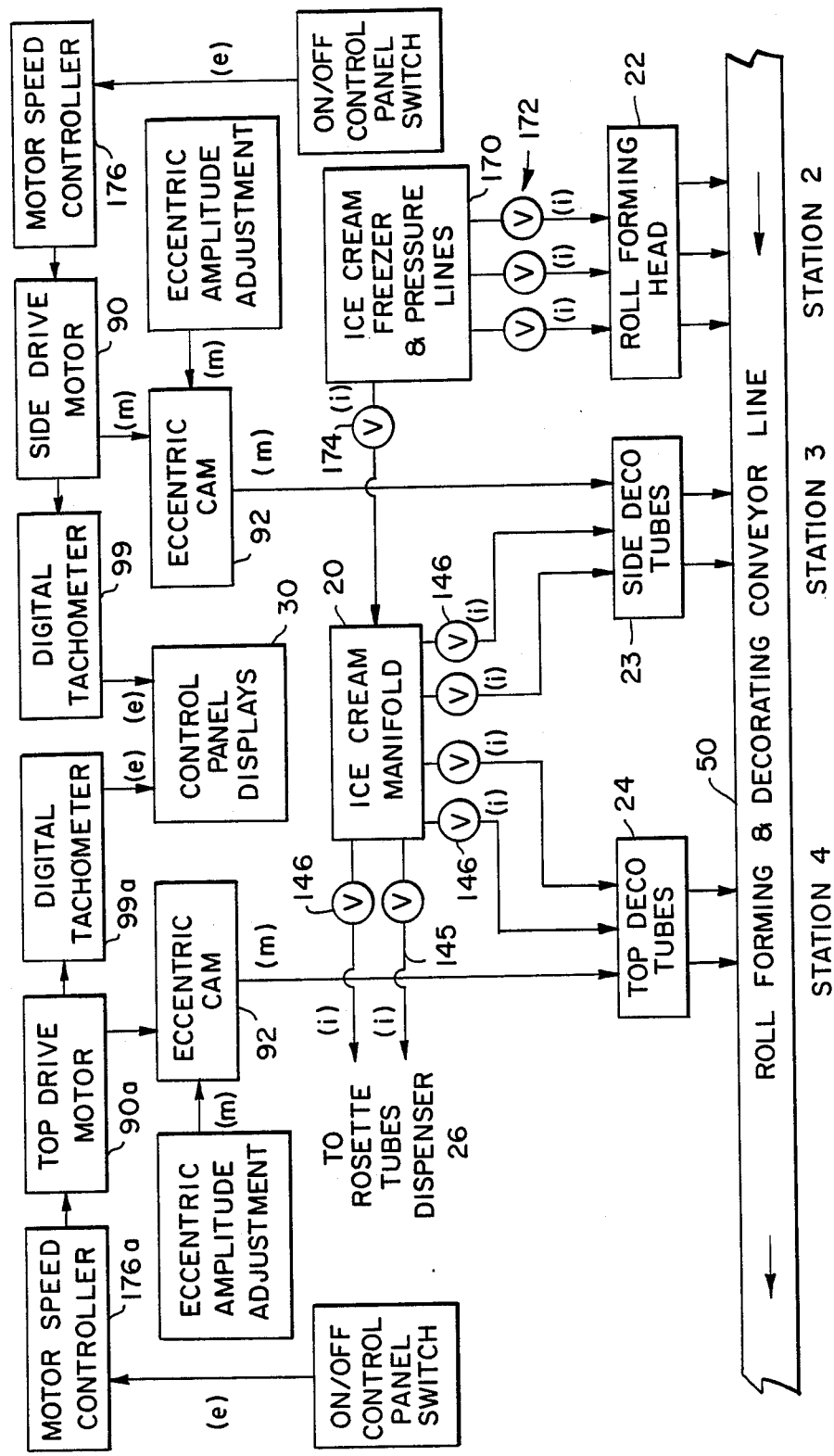
FIG. 16, 16A, and 16B are detailed block diagrams showing the operation and control system for the ice cream roll manufacturing machine.

Referring to FIG. 16, the three inlets of the roll forming head 22 are coupled to respective ice cream freezers and pressure lines 170 which provide continuous sources of pressurized ice cream in three flavors. These pressure lines are controlled by manual valves 172. The ice cream manifold is also coupled to the ice cream freezers and pressure lines through a manual valve 174 for delivering ice cream on multiple outlet lines 145 controlled by multiple manual valves 146. Two of the outlet lines 145 are coupled through ice cream distribution lines to the side ice cream wave forming decorator tubes or dispenser 23 for continuous operation when the respective manual valves 146 are open. Two other outlet lines 145 are coupled through ice cream distribution lines to the top ice cream wave forming decorator tubes or dispenser 24 for continuous operation when the corresponding or respective manual valves 146 are open. Two further outlet lines 145 are coupled through ice cream distribution lines to the rosette tubes or rosette dispenser 26 through manual valves 146. However, unlike the side wave forming dispenser 23 and top wave forming dispenser 24, the rosette dispenser 26 incorporates its own automatic solenoid valves 130 and 131 under control of the programmed controller for automatic operation as shown in FIG. 16A.

Figure 15:
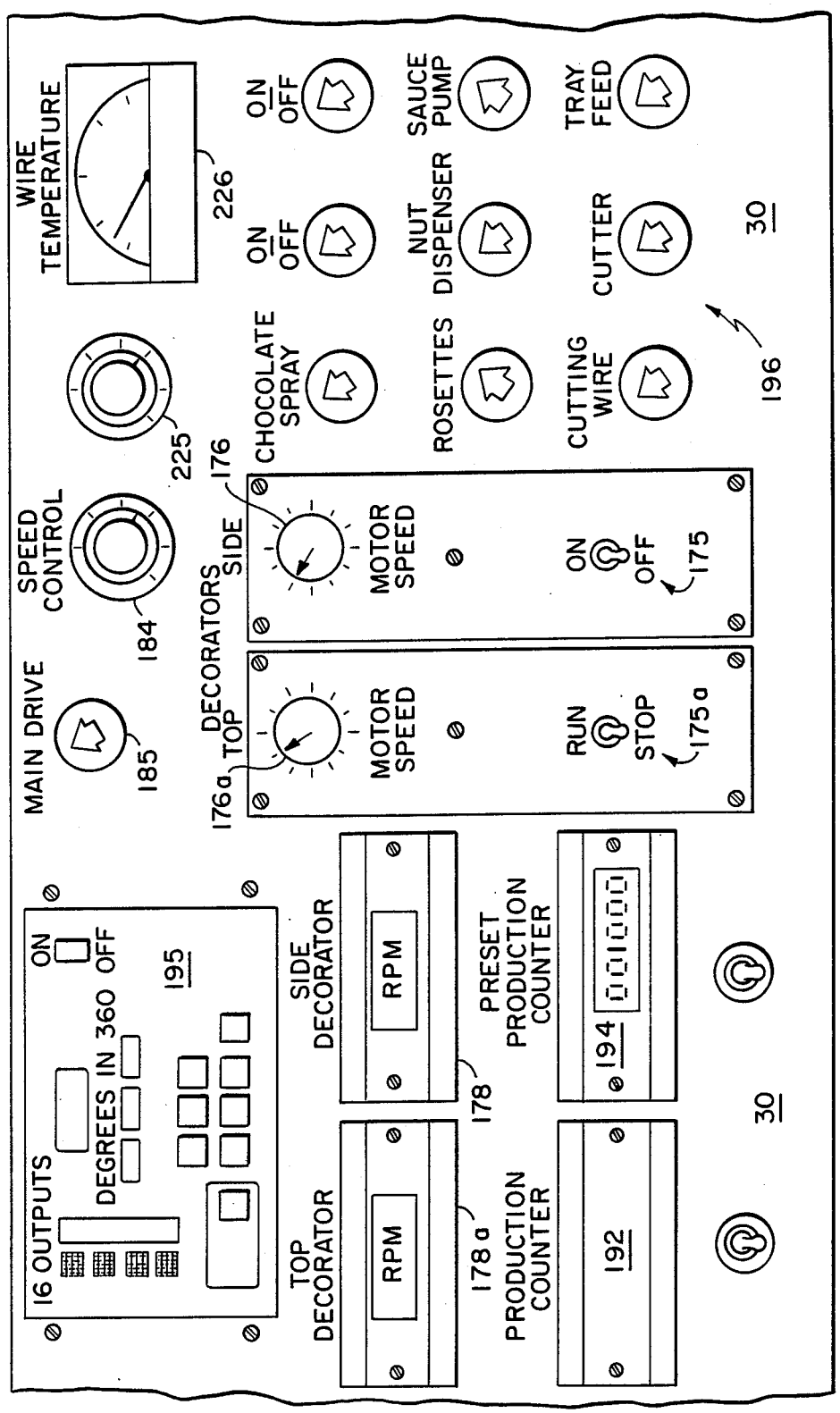
FIG. 15 is a detailed diagrammatic view of the central control panel positioned between Stations 2 and 3.

In operation of each of the ice cream wave forming dispensers 23 and 24 as heretofore described drive motors 90, 90a controlled by motor speed controllers 176, 176a also actuate digital tachometers 99, 99a which generate RPM signals for RPM displays 178, 178a on the control panel 30 illustrated in FIG. 15 for displaying the respective side drive motor frequency and top drive motor frequency. Motor speed controller rheostats 176 and 176a control the frequency of the ice cream wave form patters while the adjustment of eccentric cams 92, 92a controls the amplitude. Manual on/off control switches 175, 175a for motors 90, 90a are also provided.

The programmed controller 180, for example a Mark VII (Trademark) model PC from C & A Products Inc. Route 47, Washington Depot, Conn., is operatively coupled for delivering electrical timing signals (e) to control elements of Stations 1, 5, 6, 7, 8 and 9 as illustrated in FIGS. 16A and 16B. The programmed controller signals (e) actuate electrically piloted switches and solenoids generally housed in the upper level cabinet 15 of frame 14. The electrically piloted solenoids deliver air pressure signals or pneumatic signals (p) for operation of pneumatic cylinders and valves which are mechanically coupled by mechanical couplings (m) to the actual dispensing hardware.

The conveyor drive motor 182, controlled by conveyor motor speed controller 184 and manual on/off switch 185 also shown on the control panel 30 of FIG. 15, drives two sprockets 186 and 188. One sprocket 186 is coupled to the PC 180 through a shaft encoder 190 so that the 360° cycle of the PC is exactly correlated with the uniform motion of the conveyor and continuous ice cream roll body. The PC in turn delivers an ice cream roll production count signal to the production counter display 192 on control panel 30 which is compared with the preset or preselected production count display 194.

The second sprocket 188 drives the conveyor 50 through, for example chain drive 195. The sizes of sprockets 186 and 188, chain drive 195 and conveyor 50, and the speed of conveyor motor 182 are selected and adjusted to correlate the 360° cycle of signals of PC 180 with the translation of conveyor 50 and the continuous ice cream roll body transported on the conveyor so that the 360° cycle of PC 180 exactly corresponds with the selected design length of the individual ice cream rolls to be cut from the roll body. For example, the ice cream roll design length may be 9 to 10 inches (22.5 to 25.4 cm).

Each 360° cycle, the PC delivers selectively timed signals programmed to occur at degree intervals or positions of the 360° cycle to the various electrically piloted switches and solenoids. The programming of the electrical control signals (e) is accomplished at the PC control subpanal 195 on control panel 30. The control panel 30 also includes a bank of manual on/off and on/off/on switches 196 for manual override control of the elements of the ingredient dispensing stations labelled on the switches 196 of control panel 30 and hereafter also mentioned with reference to FIGS. 16A and 16B.

Figure 16A:
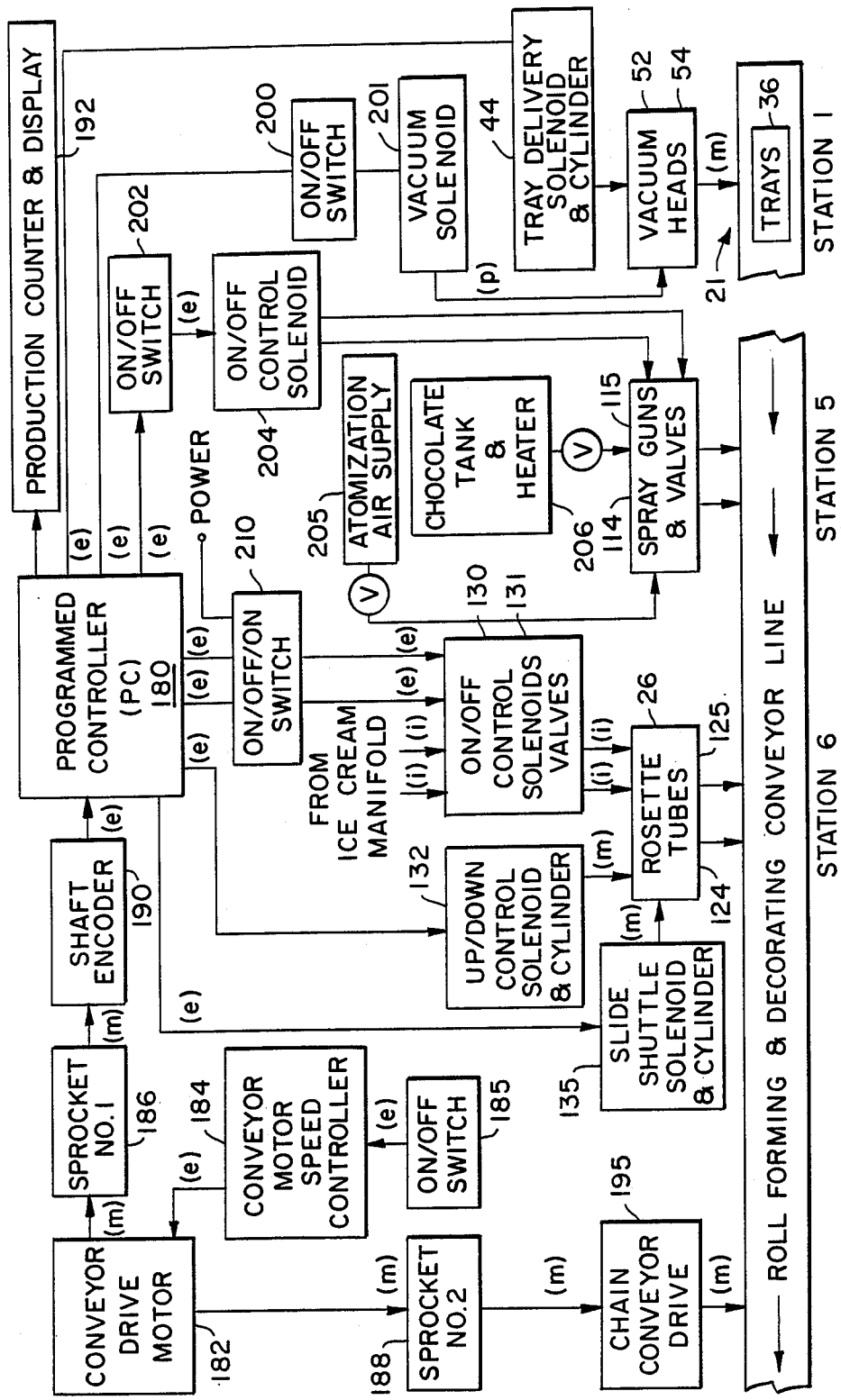
Figure 16B:
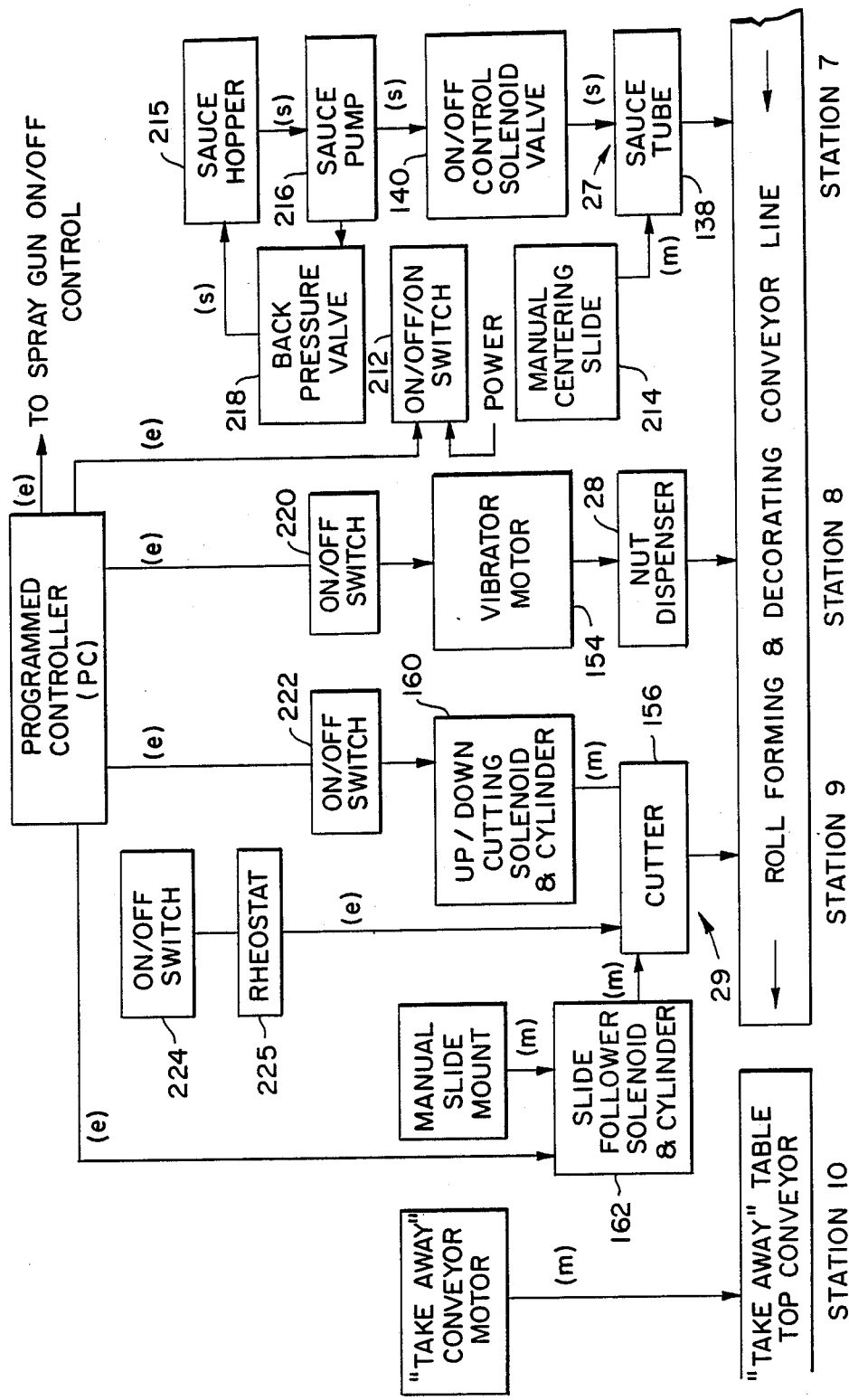

In the operational block diagrams of FIGS. 16A and 16B the electrically piloted solenoids are generally shown combined with the pneumatic cylinders and valves which they control for economy of space and simplicity in the block diagram presentation. Physically, however, it is convenient to arrange the electrically piloted solenoids in a bank of solenoids next to the control panel 30 and PC 180 in the upper level cabinet 15 of frame 14. From there the solenoids control delivery of air pressure signals over pneumatic lines to the dispensing hardware at the respective stations.

As heretofore described PC signals (e) actuate tray delivery solenoid and cylinder 44 each 360° cycle for dispensing trays 36 from tray dispenser 21 at Station 1 onto the conveyor 50. Similarly, PC signals (e) through switch 200 actuate the vacuum solenoid 201 for activating the vacuum heads 52 and 54 at appropriate intervals or positions each 360° cycle. At station 5 PC signals (e) through switch 202 activate the spray gun control solenoid 204 to operate the valves on spray guns 114 and 115. With the valves open, pressurized, atomization air from sanitary air supply 205 sprays chocolate from heated chocolate supply tank 206 through the spray nozzles of spray guns 114 and 115.

At station 6 PC control signals (e) each 360° cycle control three cooperating elements of the rosette dispenser 26. Signals through switch 210 control solenoid valves 130, 131 and the timing of dispensing of ice cream through the rosette tubes 124 and 125. Similarly PC signals (e) activate the up/down control solenoid and cylinder 132 and slide shuttle solenoid and cylinder 135 to correlate motion of the rosette dispenser tubes 124 and 125 with each ice cream roll length of the moving ice cream roll body.

Dispensing of flow sauce from flow sauce dispenser 27 at Station 7 is activated by PC signals (e) through switch 212 to solenoid control valve 140 which opens and closes the sauce tube 138. A manual mounting slide 214 permits manual centering of the sauce tube 138. With sauce tube valve 140 open, sauce from hopper 215 is pumped by sauce pump 216 through the sauce tube 138. Excess sauce and sauce under pressure when the valve 140 is closed returns to the hopper 215 through back pressure valve 218. The vibrator motor 154 is turned on by PC signal (e) through switch 220 for dispensing solids such as nuts from the solids dispenser 28.

Finally, at station 9, PC signals (e) activate the up/down cutting control solenoid and cylinder 160 through switch 222 and the slide follower control solenoid and cylinder 162, moving the cutting wire 156 of roll cutter 29 in a parallelogram trajectory as heretofore described. The roll cutting wire 156 is heated by a current through switch 224 and variable rheostat 225 to control the wire temperature shown on wire temperature display 226 of control panel 30. Typically, the wire is heated by a current of 5 amps at 12 volts DC.

An example program for the programmed controller 180 is shown in Table II. This program specifies the timing position for initiation or turn on of each PC control signal (e) for each of the dispensing station control solenoids and valves and the on interval between the on and off timing positions. The program in Table II specifies the control signal cycle for each 360° cycle with on and off timing positions specified in degrees of the 360° cycle. In this example, the programmed controller 180 affords sixteen control signal positions each 360° cycle utilized in the manner illustrated in TABLE II. Not shown is the signal for cleaning the spray guns by closing the nozzle for example for 1° to 2° each cycle.

TABLE II

| CONTROL SOLENOID/VALVE FOR | ON/OPEN DOWN/OUT | OFF/CLOSE UP/RETURN |
|---|---|---|
| 1. Rosette tube valves | Open 140° | Close 160° |
| 2. Rosette slide shuttle cylinder | Out 120° | Return 200° |
| 3. | | |
| 4. Rosette up/down cylinder | Down 130° | Up 175° |
| 5. | | |
| 6. Spray gun valve No. 1 | Open 60° | Close 220° |
| 7. Spray gun valve No. 2 | Open 70° | Close 230° |
| 8. Tray dispenser cylinder | Up 350° | Down 25° |
| 9. Tray dispenser vacuum | On 345° | Off 90° |
| 10. Solids dispenser vibrator motor | On 150° | Off 270° |
| 11. Flow sauce tube valve | Open 350° | Close 160° |
| 12. | | |
| 13. | | |
| 14. Cutter slide follower cylinder | Out 102° | Return 252° |
| 15. Up/down cutting cylinder | Down 92° | Up 117° |
| 16. | | |

While the invention has been described with reference to particular preferred example embodiments it is intended to cover all modifications and equivalents within the scope of the following claims.

I claim:

1. A new machine for manufacturing decorative ice cream rolls comprising:
   an elongate frame comprising a plurality of ingredient dispensing stations including a plurality of ice cream dispensing stations arranged along the frame;
   ice cream roll body conveyor means for conveying a continuous ice cream roll body with substantially uniform motion along the frame and the respective ingredient dispensing stations from an upstream end of the conveyor means to a downstream end of the conveyor means;
   an ice cream roll body forming station comprising a roll forming head having at least one ice cream inlet for coupling to a continuous flow source of pressurized ice cream and at least one outlet for delivering a continuous ice cream roll body with at least one arcuate layer of ice cream and a generally flat base onto the conveyor means;
   at least one ice cream dispensing ice cream wave forming station comprising at least one ice cream dispensing tube or nozzle having an inlet for operative coupling through an ice cream distribution line to a continuous flow source of pressurized ice cream, motor means, eccentric slide coupling means mechanically coupling the motor means to the ice cream dispensing tube or nozzle for dispensing ice cream through the dispensing tube in a wave form pattern on an ice cream roll body being conveyed along the frame, said eccentric slide coupling means being adjustable for varying the amplitude of the wave form pattern, said motor means comprising adjustable speed control means for varying the frequency of the wave form pattern;
   and an ice cream roll body cutting station at the downstream end of the conveyor means comprising an ice cream roll body cutter mounted and arranged for cutting the ice cream roll body into separate ice cream rolls.

2. The machine of claim 1 comprising an ice cream side wave forming station comprising at least one ice cream dispensing tube of nozzle having an inlet for operative coupling through an ice cream distribution line to a continuous flow source of pressurized ice cream, side motor means, and side eccentric slide coupling means mechanically coupling the side motor means to the ice cream dispensing tube or nozzle for motion of the ice cream dispensing tube up and down in a substantially vertical plane for dispensing ice cream through the dispensing tube in a substantially vertical wave form pattern along at least one side of the ice cream roll body.

3. The machine of claim 2 wherein the ice cream side wave forming station comprises at least two ice cream dispensing tubes positioned and arranged for dispensing ice cream through the dispensing tubes in substantially vertical wave form patterns along each side of the ice cream roll body.

4. The machine of claim 1 comprising an ice cream top wave forming station comprising at least one ice cream dispensing tube or nozzle having an inlet for operative coupling through an ice cream distribution line to a continuous flow source of pressurized ice cream, top motor means, and top eccentric slide coupling means mechanically coupling the top motor means to the ice cream dispensing tube or nozzle for motion of the ice cream dispensing tube laterally back and forth in a substantially horizontal plane for dispensing ice cream through the dispensing tube in a substantially horizontal wave form pattern along the top of an ice cream roll body being conveyed along the frame.

5. The machine of claim 1 wherein the roll forming head comprises a plurality of ice cream inlets for coupling to a plurality of continuous flow sources of pressurized ice cream having different ice cream flavors and a plurality of outlets for delivering a continuous ice cream roll body having a plurality of arcuate layers of ice cream of different flavors onto the successive adjacent support means transported by the conveyor means.

6. The machine of claim 1 wherein the cutting station and roll body cutter comprises a cutting wire, an up/down cutting cylinder means mounting said cutting wire for motion up and down at an angle from the vertical, said cutting cylinder means being mounted at an angle from the vertical in the direction of the downstream end of the conveyor to compensate for motion of the ice cream roll body on the conveyor means during cutting for achieving a vertical cut, and timing means operatively coupled to the cutting cylinder means to actuate the cutting cylinder means from a starting position for cutting individual ice cream rolls from the continuous roll body.

7. The machine of claim 6 comprising second take away conveyor means positioned adjacent to the downstream end of the roll body conveyor means for receiving individual ice cream rolls cut from the continuous roll body at the roll body cutting station, said take away conveyor means having a faster speed than the roll body conveyor means for removing and separating the individual ice cream rolls.

8. The machine of claim 7 wherein the cutter is further mounted on a second lateral slide out cylinder means operatively coupled for imparting substantially horizontal lateral movement to the cutter away from the ice cream roll body after cutting movement of the cutter in the downward direction for spacing the cutter from the continuous roll body.

9. The machine of claim 8 wherein the timing means comprises programmed controller means operatively coupled to the cutting cylinder means and slide out cylinder means, said programmed controller means being operatively programmed for actuation of the cutting cylinder means from a starting position to the downward cutting direction through the ice cream roll body, followed by actuation of the slide out cylinder means for spacing the cutter laterally and horizontally from the continuous ice cream roll body, followed by actuation of the cutting cylinder means for return of the cutter in the upward direction, followed by actuation of the slide out cylinder means for return of the cutter in the lateral direction to the starting position for cutting individual ice cream rolls from the continuous ice cream roll body.

10. The machine of claim 9 further comprising support means dispensing station constructed and arranged for delivering successive adjacent support means onto the conveyor means at the upstream end for supporting an ice cream roll body for transport on the conveyor means along the frame and wherein the programmed controller means is also coupled to the support means dispensing station for actuating said dispensing station for dispensing successive adjacent support means onto the conveyor means.

11. The machine of claim 1 further comprising:
a sauce spray dispensing station comprising at least one spray gun means and spray gun control means for opening and closing said spray gun for spraying sauce when the spray gun is open;
ice cream rosette dispensing station comprising at least one ice cream dispensing rosette tube having an inlet for operative coupling through an ice cream distribution line to a continuous flow source of pressurized ice cream and rosette control means for opening and closing said rosette tube;
sauce flow dispensing station comprising a sauce tube and sauce pump, and sauce tube control means for controlling the flow of sauce from the sauce tube;
a solids dispensing station comprising a hopper and trough, and vibrator motor means for delivering and dispensing solid pieces from the hopper and trough, and solids dispenser control means for turning on and off the vibrator motor;
and programmed controller means operatively coupled to the spray gun control means, rosette control means, flow sauce tube control means, and solids dispenser control means for selectively by-passing, actuating, and timing the dispensing of spray sauce, ice cream rosettes, flow sauce and solid condiments or nuts on the continuous ice cream roll body according to the design of individual rolls to be cut from the roll body.

12. The machine of claim 11 wherein the ice cream rosette dispensing station comprises first and second ice cream rosette dispensing tubes spaced apart and positioned and arranged one upstream from the other in the direction of the conveyor means, and further comprising slide follower cylinder means mounting said rosette tubes for movement following an ice cream roll body on the conveyor means upon actuation of the slide follower cylinder means, said programmed controller means being operatively coupled to the slide follower cylinder means for actuation of the slide follower cylinder means at substantially the same time as actuation of the rosette control cylinder means for opening the rosette tubes and dispensing rosettes from said rosette tubes on the ice cream roll body.

13. The machine of claim 1 comprising support means dispensing station constructed and arranged for delivering successive adjacent support means onto the conveyor means at the upstream end for supporting an ice cream roll body for transport on the conveyor means along the frame and wherein said support means dispensing station comprises a corner post column support for supporting a stack of trays mounted in the column support at the sides of the trays over the upstream end of the conveyor means, a tray dispensing cylinder means mounted below the conveyor means and column support, said dispensing cylinder means comprising at least one arm extendable above the conveyor means to the bottom of a stack of trays mounted in the column support, and a vacuum head mounted on the end of said arm for engaging the bottom of the bottom tray of the stack, said trays being flexible for disengagement from the column support upon downward pulling by the dispensing cylinder means for placement on the conveyor means.

14. A new machine for manufacturing decorative ice cream rolls comprising:
an elongate frame comprising a plurality of ingredient dispensing stations including ice cream dispensing stations arranged along the frame;
an ice cream manifold mounted on the frame formed with an ice cream inlet for coupling to a continuous flow source of pressurized ice cream and a plurality of outlets for coupling through a plurality of ice cream distribution lines to the ice cream dispensing stations;
ice cream roll body conveyor means for conveying a continuous ice cream roll body with substantially uniform motion along the frame and the respective ingredient dispensing stations from an upstream end of the conveyor means to a downstream end of the conveyor means;
support means dispensing station constructed and arranged for delivering successive adjacent support trays of chips onto the conveyor means at the upstream end for supporting an ice cream roll body for transport on the conveyor means along the frame;
an ice cream roll body forming station comprising a roll forming head having at least one ice cream inlet for coupling to a continuous flow source of pressurized ice cream and at least one outlet for delivering a continuous ice cream roll body with at least one arcuate layer of ice cream and a generally flat vase onto the successive adjacent support means transported by the conveyor means;
at least one ice cream dispensing ice cream wave forming station comprising at least one ice cream dispensing tube or nozzle having an inlet for operative coupling through an ice cream distribution line to the ice cream manifold, and wave motor means for dispensing ice cream through the dispensing tube in a wave form pattern on the ice cream roll body;

an ice cream roll body cutting station at the downstream end of the conveyor means comprising an ice cream roll body cutter wire mounted and arranged for cutting the ice cream roll body into separate ice cream rolls and a cutting cylinder means mounting said roll body cutter wire for motion up and down at an angle from the vertical, said cutting cylinder means being mounted at an angle from the vertical in the direction of the downstream end of the conveyor to compensate for motion of the ice cream roll body on the conveyor means during cutting for achieving a substantially vertical cut;

and programmed controller means operatively coupled to the cutting cylinder means and a plurality of the ingredient dispensing stations for bypassing, actuating, and timing the dispensing of ingredients on the ice cream roll body according to the design of the individual rolls to be cut from the roll body and for actuating and timing the cutting cylinder means for cutting said individual ice cream rolls from the ice cream roll body between successive adjacent support trays.

15. The machine of claim 14 wherein the ingredient dispensing stations comprise an ice cream rosette dispensing station which comprises first and second ice cream rosette dispensing tubes spaced apart and positioned and arranged one upstream from the other in the direction of the conveyor means, further comprising slide follower cylinder means mounting said rosette tubes for lateral movement following an ice cream roll body upon actuation of the slide follower cylinder means, said programmed controller means being operatively coupled to the slide follower cylinder means for actuation of the slide follower cylinder means to follow the roll body substantially at the same time as actuation of the rosette control cylinder means to open the rosette tubes for dispensing ice cream rosettes, said ice cream rosettes forming ice cream dams at the top of the ice cream roll body for containing flow sauce.

16. The machine of claim 14 wherein the programmed controller means comprises a 360° control signal cycle and wherein the conveyor means comprises a conveyor motor for driving the conveyor means, said conveyor motor means being operatively coupled to the programmed controller means for correlating the conveyor speed with the programmed controller control signal cycle so that each 360° control signal cycle is completed in the length of travel of the conveyor means corresponding to the length of the ice cream rolls to be cut from the ice cream roll body, said programmed controller means being operatively coupled to a plurality of the ingredient dispensing stations for controlling and timing the dispensing of ingredients by programmed control signals at selected degrees during each 360° control signal cycle for selectively forming and decorating each ice cream roll length to be cut from the continuous ice cream roll body.

17. A new machine for manufacturing decorative ice cream rolls comprising:

an elongate frame comprising a plurality of ingredient dispensing stations including a plurality of ice cream dispensing stations arranged along the frame;

ice cream roll body conveyor means for conveying a continuous ice cream roll body along the frame and the respective ingredient dispensing stations from an upstream end of the conveyor means to a downstream end of the conveyor means;

ice cream roll body forming station comprising a roll forming head having at least one ice cream inlet for coupling to a continuous flow source of pressurized ice cream and at least one outlet for delivering a continuous ice cream roll body with at least one arcuate layer of ice cream and a generally flat base for transport by the conveyor means;

an ice cream roll body cutting station at the downstream end of the conveyor means comprising an ice cream roll body cutter mounted and arranged for cutting the ice cream roll body into lengths of separate ice cream rolls;

programmed controller means operatively coupled to a plurality of the ingredient dispensing stations for controlling dispensing of ingredients by programmed control signals at selected intervals corresponding to lengths of separate ice cream rolls;

said conveyor means comprising conveyor motor means operatively coupled to the programmed controller means for correlating the speed of the conveyor means with the programmed controller means.

18. The machine of claim 17 wherein the ingredient dispensing stations comprise:

a sauce spray dispensing station comprising at least one spray gun means and spray gun control means for opening and closing said spray gun;

ice cream rosette dispensing station comprising at least one ice cream dispensing rosette tube having an inlet for operative coupling to a continuous flow source of pressurized ice cream and rosette control means for opening and closing said rosette tube;

sauce flow dispensing station comprising a sauce tube and sauce pump, and flow sauce tube control means for controlling the flow of sauce from the sauce tube;

a solids dispensing station comprising a hopper and trough, and vibrator motor means for delivering and dispensing solid pieces from the hopper and trough, and solids dispenser control means;

said programmed controller means being operatively coupled to the spray gun control means, rosette control means, flow sauce tube control means and solids dispenser control means for delivering control signals to selected ones of said ingredient dispensing stations at said selected intervals.

19. The machine of claim 17 wherein the cutting station and roll body cutter comprises a cutting wire, up/down cutting cylinder means mounting said cutting wire for motion up and down at an angle from the vertical, said cutting cylinder means being mounted at an angle from the vertical in the direction of the downstream end of the conveyor means to compensate for motion of the ice cream roll body on the conveyor means during cutting for achieving a substantially vertical cut, said roll body cutter being further mounted on lateral slide out cylinder means operatively coupled for imparting lateral or horizontal movement to the cutter away from the ice cream roll body after cutting movement of the cutter in the downward direction, said programmed controller means being operatively coupled to the cutting cylinder means and slide out cylinder means at the cutting station and being operatively programmed for actuation of the cutting cylinder means from a starting position to the downward cutting direction, followed by actuation of the slide out cylinder means for spacing the cutter laterally and horizontally from the continuous roll body, followed by actuation of the cutting cylinder means for return of the cutter in the upward direction, followed by actuation of the slide out cylinder means for return of the cutter in the lateral direction to the starting position, said cutting wire traversing a substantially parallelogram trajectory for cutting individual ice cream rolls from the ice cream roll body.

20. The machine of claim 17 further comprising:
a support tray dispensing station constructed and arranged for delivering successive adjacent support trays onto the conveyor means at the upstream end for supporting an ice cream roll body for transport on the conveyor means along the frame; said support tray dispensing station comprising a corner post column support for supporting a stack of trays mounted in the column support at the sides of the trays over the upstream end of the conveyor means, a tray dispensing cylinder means mounted below the conveyor means and column support, said dispensing cylinder means comprising at least one arm extendable above the conveyor means to the bottom of a stack of trays mounted in the column support, and a vacuum head mounted on the end of said arm for engaging the bottom of the bottom tray of the stack, said trays being flexible for disengagement from the column support upon downward pulling by the dispensing cylinder means for placement on the conveyor means.

* * * * *